US011967242B2

(12) United States Patent
Hilleary

(10) Patent No.: US 11,967,242 B2
(45) Date of Patent: *Apr. 23, 2024

(54) RAILROAD CROSSING AND ADJACENT SIGNALIZED INTERSECTION VEHICULAR TRAFFIC CONTROL PREEMPTION SYSTEMS AND METHODS

(71) Applicant: THE ISLAND RADAR COMPANY, Olathe, KS (US)

(72) Inventor: Thomas N. Hilleary, Lenexa, KS (US)

(73) Assignee: The Island Radar Company, Olathe, KS (US)

(*) Notice: Subject to any disclaimer, the term of this patent is extended or adjusted under 35 U.S.C. 154(b) by 895 days.

This patent is subject to a terminal disclaimer.

(21) Appl. No.: 16/881,312

(22) Filed: May 22, 2020

(65) Prior Publication Data

US 2021/0142684 A1 May 13, 2021

Related U.S. Application Data

(63) Continuation of application No. 14/944,349, filed on Nov. 18, 2015, now Pat. No. 10,665,118.

(60) Provisional application No. 62/081,717, filed on Nov. 19, 2014.

(51) Int. Cl.

| | |
|---|---|
| ***G08G 7/02*** | (2006.01) |
| ***B61L 29/22*** | (2006.01) |
| ***B61L 29/28*** | (2006.01) |
| ***B61L 29/30*** | (2006.01) |
| ***G08G 1/087*** | (2006.01) |

(52) U.S. Cl.

CPC ................ *G08G 7/02* (2013.01); *B61L 29/22* (2013.01); *B61L 29/28* (2013.01); *B61L 29/30* (2013.01); *G08G 1/087* (2013.01)

(58) Field of Classification Search

CPC .......... G08G 7/02; G08G 1/087; B61L 29/22; B61L 29/28; B61L 29/30; B61L 29/282; B61L 23/041; B61L 27/53; G01S 2013/9328

USPC .......................................................... 246/125

See application file for complete search history.

(56) References Cited

U.S. PATENT DOCUMENTS

| | | | | |
|---|---|---|---|---|
| 6,179,252 | B1 * | 1/2001 | Roop | B61L 29/18 246/122 R |
| 6,340,139 | B1 | 1/2002 | Hilleary | |
| 6,371,417 | B1 | 4/2002 | Southon | |
| 6,386,486 | B1 | 5/2002 | Speranza | |
| 6,502,030 | B2 | 12/2002 | Hilleary | |
| 6,641,091 | B1 | 11/2003 | Hilleary | |
| 6,688,561 | B2 | 2/2004 | Mollet et al. | |
| 7,196,636 | B2 * | 3/2007 | Graham | B61L 29/28 246/473 R |
| 7,295,111 | B2 | 11/2007 | Pieralli | |
| 7,439,876 | B2 | 10/2008 | Pieralli | |

(Continued)

*Primary Examiner* — Zachary L Kuhfuss

(74) *Attorney, Agent, or Firm* — Armstrong Teasdale LLP

(57) ABSTRACT

A traffic control preemption system monitors an operating state of a railroad crossing, without requiring an interface with railroad crossing equipment, and communicates information to a traffic controller of an adjacent signalized roadway intersection to improve vehicular traffic flow at the railroad crossing. The traffic control preemption system is configured to make real time health assessments of preemption system functionality and provide a degree of redundancy and failsafe operation to the traffic control system.

26 Claims, 7 Drawing Sheets

(56) References Cited

U.S. PATENT DOCUMENTS

| | | | | |
|---|---|---|---|---|
| 7,573,400 | B2 | 8/2009 | Arnold et al. | |
| 8,028,961 | B2 | 10/2011 | Ashraf et al. | |
| 8,157,219 | B2 | 4/2012 | Ashraf et al. | |
| 8,469,320 | B2 | 6/2013 | Baldwin et al. | |
| 8,517,316 | B2 | 8/2013 | Baldwin et al. | |
| 8,596,587 | B2 | 12/2013 | Hilleary | |
| 8,600,411 | B2 * | 12/2013 | Subramanian | G01C 21/20 455/456.3 |
| 8,888,052 | B2 | 11/2014 | Baldwin et al. | |
| 8,899,530 | B2 | 12/2014 | Hogan | |
| 8,909,396 | B2 | 12/2014 | Hilleary | |
| 9,067,609 | B2 | 6/2015 | Baldwin et al. | |
| 9,193,367 | B2 | 11/2015 | Hilleary | |
| 9,340,220 | B2 | 5/2016 | Fries et al. | |
| 9,376,129 | B2 | 6/2016 | Hilleary | |
| 10,106,079 | B2 | 10/2018 | Denny et al. | |
| 10,665,118 | B2 * | 5/2020 | Hilleary | G08G 7/02 |
| 2002/0099793 | A1 | 7/2002 | Hilleary | |
| 2004/0249571 | A1 | 12/2004 | Blesener et al. | |
| 2005/0184883 | A1 | 8/2005 | Graham | |
| 2006/0015224 | A1 | 1/2006 | Hilleary | |
| 2006/0232440 | A1 | 10/2006 | Pieralli et al. | |
| 2008/0136632 | A1 | 6/2008 | Pieralli | |
| 2008/0169385 | A1 | 7/2008 | Ashraf et al. | |
| 2008/0169939 | A1 | 7/2008 | Dickens et al. | |
| 2008/0183306 | A1 * | 7/2008 | Ashraf | B61L 29/22 246/125 |
| 2008/0236275 | A1 | 10/2008 | Breed et al. | |
| 2010/0108823 | A1 | 5/2010 | Barnes | |
| 2012/0181390 | A1 * | 7/2012 | Ashraf | B61L 29/22 246/122 R |
| 2012/0286103 | A1 | 11/2012 | Hilleary | |
| 2013/0018534 | A1 | 1/2013 | Hilleary | |
| 2013/0261950 | A1 | 10/2013 | Sasabuchi et al. | |
| 2013/0277506 | A1 * | 10/2013 | Baldwin | B61L 29/282 246/473 R |
| 2013/0341468 | A1 * | 12/2013 | Baldwin | B61L 29/22 246/130 |
| 2016/0189552 | A1 | 6/2016 | Hilleary | |
| 2016/0200334 | A1 | 7/2016 | Hilleary | |
| 2017/0057528 | A1 | 3/2017 | Green et al. | |
| 2018/0029619 | A1 | 2/2018 | Rosenberger et al. | |
| 2018/0186392 | A1 | 7/2018 | DaCosta et al. | |
| 2018/0222506 | A1 | 8/2018 | Kranz | |
| 2019/0135317 | A1 | 5/2019 | Hilleary | |
| 2023/0173859 | A1 | 6/2023 | Scherer et al. | |

* cited by examiner

RAILROAD CROSSING AND ADJACENT SIGNALIZED INTERSECTION VEHICULAR TRAFFIC CONTROL PREEMPTION SYSTEMS AND METHODS

CROSS REFERENCE TO RELATED APPLICATIONS

This application is a continuation application of U.S. application Ser. No. 14/944,349 filed Nov. 18, 2015 and now U.S. Pat. No. 10,665,118 which claims the benefit of U.S. Provisional Patent Application Ser. No. 62/081,717 filed Nov. 19, 2014, the complete disclosures of which are hereby incorporated by reference in their entirety.

BACKGROUND OF THE INVENTION

The field of the invention relates generally to railroad crossing systems configured to detect a train on approach to a railroad grade crossing and prepare the crossing for the train's arrival, and more specifically to a railroad crossing traffic control preemption system operable independently from railroad system equipment and facilitating an efficient automotive vehicle traffic flow control at a signalized traffic intersection proximate a railroad grade crossing.

Railroad crossing detection and notification systems are generally known that are activated as a locomotive train approaches an intersection of a railroad track (or tracks) and a road surface for automotive vehicle use, referred to herein as a rail grade crossing. Among other things, such railroad crossing detection and notification systems may operate one or more crossing gates to keep automotive vehicles from entering the crossing as a detected locomotive train approaches, as well as allow automotive vehicles to exit the crossing before the crossing gates descend and the train arrives. Such railroad crossing detection and notification systems are generally effective for the railroad's purposes but are nevertheless sub-optimal in other aspects. Improvements are desired.

BRIEF DESCRIPTION OF THE DRAWINGS

Non-limiting and non-exhaustive embodiments are described with reference to the following Figures, wherein like reference numerals refer to like parts throughout the various views unless otherwise specified.

DETAILED DESCRIPTION OF THE INVENTION

Figure 1:
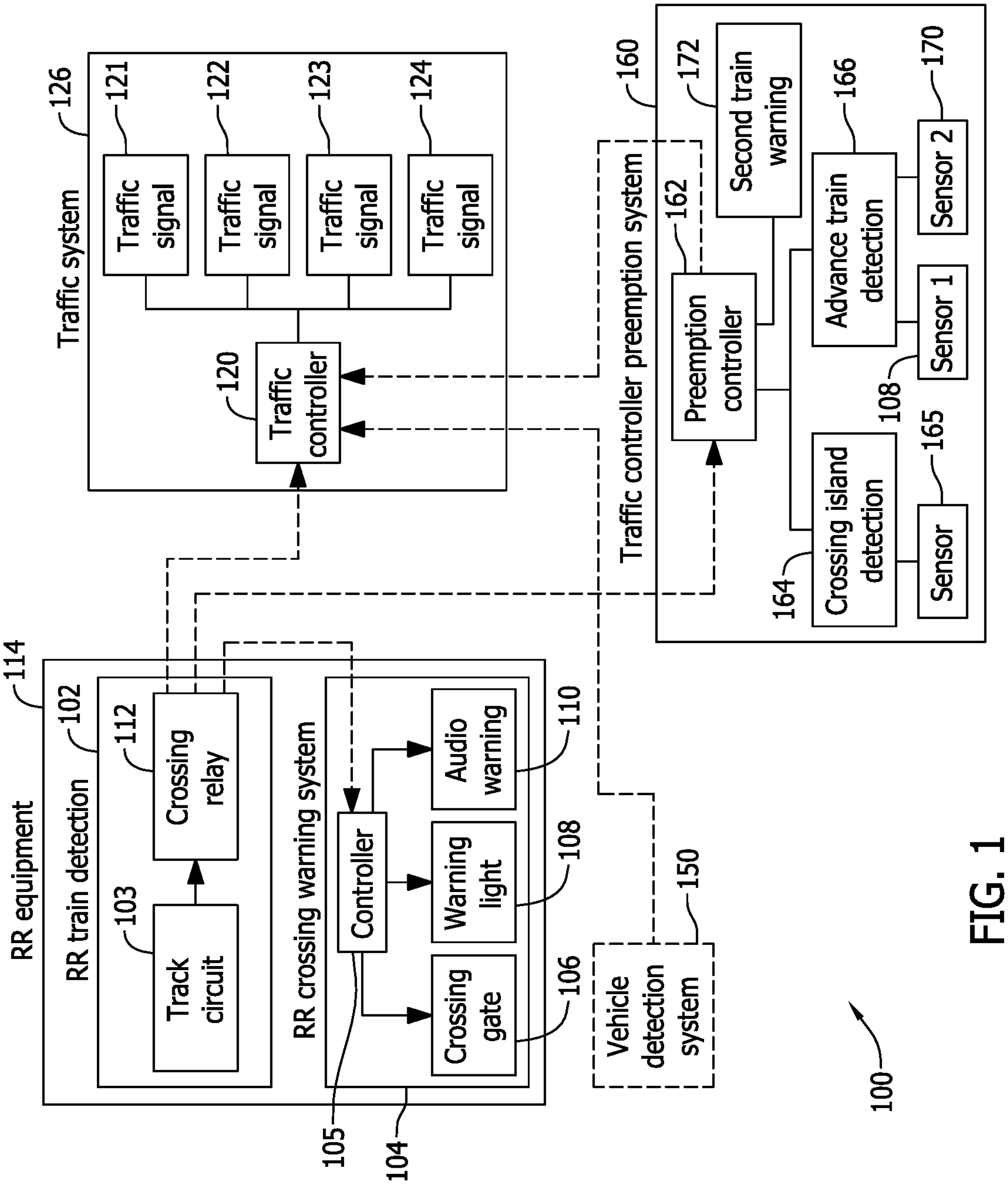
FIG. 1 is a block diagram of an exemplary railroad crossing system including an exemplary traffic control preemption system according to one embodiment of the present invention.

Aspects of the inventive traffic control preemption system concepts and methods, and related benefits and advantages thereof, that address some long felt and unresolved needs in the art are described and/or will be apparent from the following description.

Improving vehicle traffic flow at adjacent intersections to railroad crossings is desirable for a number of reasons. Known railroad crossing detection and notification systems are designed, however, predominately from a safety perspective at each crossing where they are installed. Existing railroad crossing detection and notification systems benefit the railroad organization and also vehicle drivers in such safety aspects, but from the perspective of vehicle traffic flow at an adjacent automotive vehicle intersection, known railroad crossing detection and notification systems present substantial disruption and delay, and sometimes unnecessary disruption and delay to vehicular traffic in the vicinity of the railroad crossing where such railroad crossing detection and notification systems are operating.

Crossing status information from railroad crossing detection and notification systems is sometimes beneficial to improving vehicular traffic flow in and around railroad crossings. Interfaces to provide information from the railroad system to the intersection system such as upcoming train arrival, crossing gate position, and train on crossing (sometimes referred to as an occupancy of the crossing) are therefore sometimes provided in existing railroad crossing systems. In many cases, however, railroad organizations are understandably reluctant to provide such interfaces because from the perspective of the railroad organization such interfaces present an increased workload and maintenance concern, increased costs install and operate the crossing systems, and liability concerns for such interfaces in use. Improved interfaces are therefore desired that may be more extensively used without impacting railroad organization concerns.

Exemplary embodiments of railroad crossing systems including traffic control preemption systems and traffic control preemption methodology are described hereinbelow that advantageously improve vehicular traffic flow through signalized vehicle traffic intersections adjacent to a railroad crossing. The traffic control preemption systems may beneficially be installed and operated without requiring an undesirable direct physical interface with railroad systems and equipment (i.e., systems and equipment for which the railroad organization bears responsibility for installing, maintaining, and operating) and without depending on the operation of the railroad system and equipment. Improved traffic control measures may be implemented by a traffic intersection controller and signal lights at a signalized roadway intersection for vehicle traffic, with the traffic intersection controller responsive to at least one signal provided by the traffic control preemption system to more efficiently control traffic flow at the signalized intersection. Method aspects will be in part explicitly discussed and in part apparent from the following description.

Figure 2:
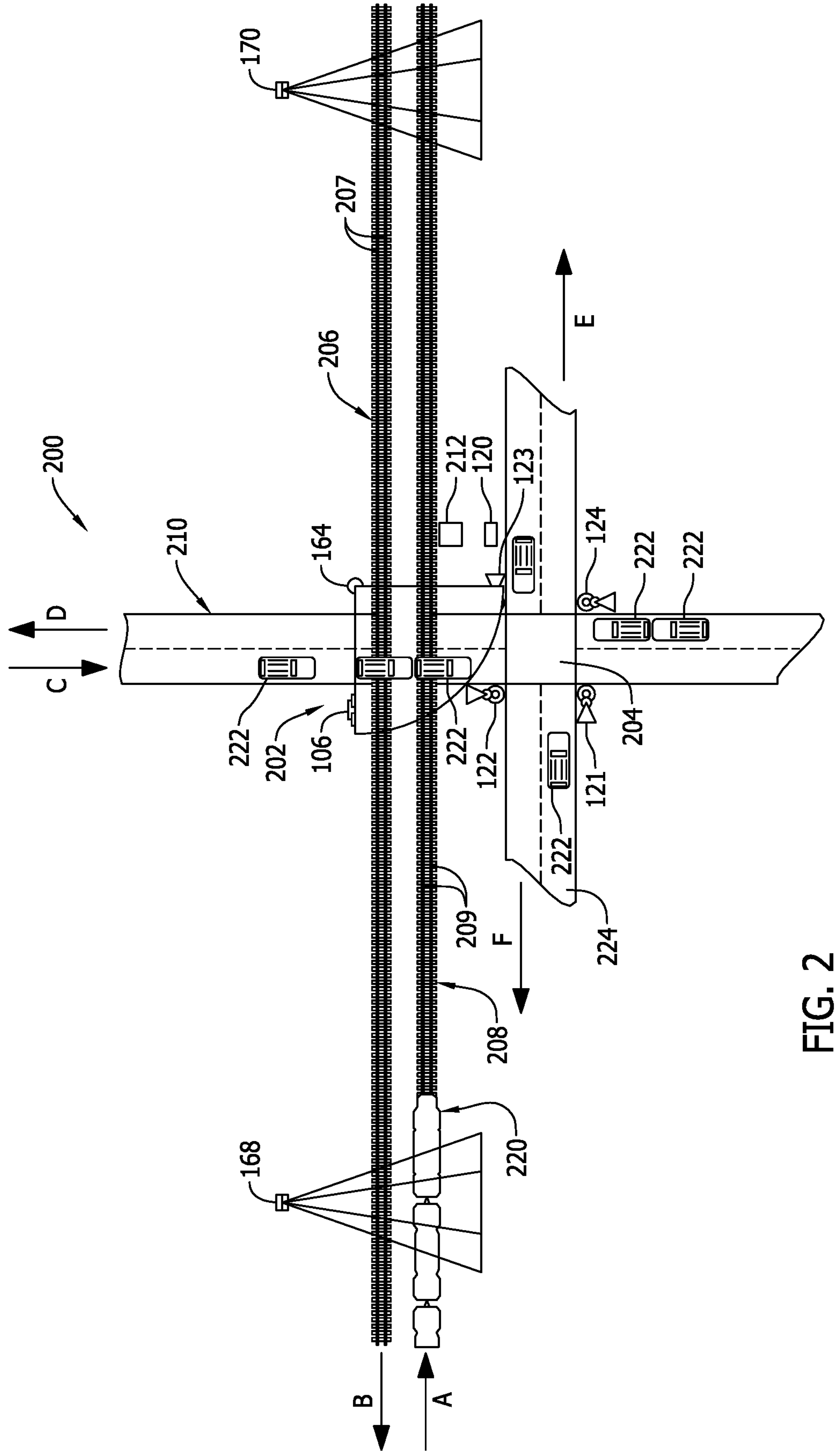
FIG. 2 illustrates an exemplary system layout for the system shown in FIG. 1 at an exemplary railroad crossing and adjacent traffic intersection that may be monitored by the system shown in FIG. 1 and with a train on approach.
Figure 3:
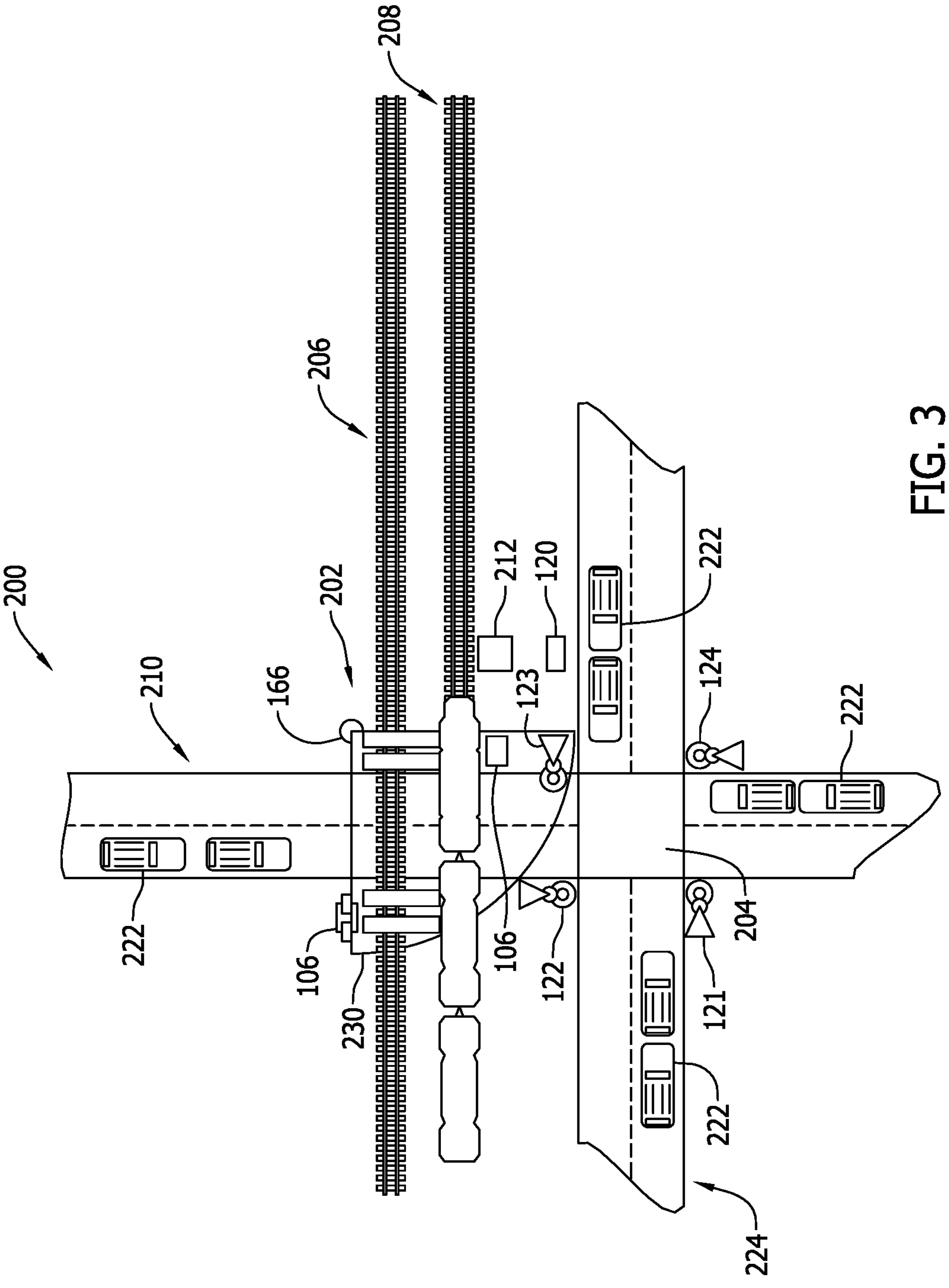
FIG. 3 is a magnified view of a portion of the system layout shown in FIG. 2 showing the train arriving at the crossing.
Figure 4:
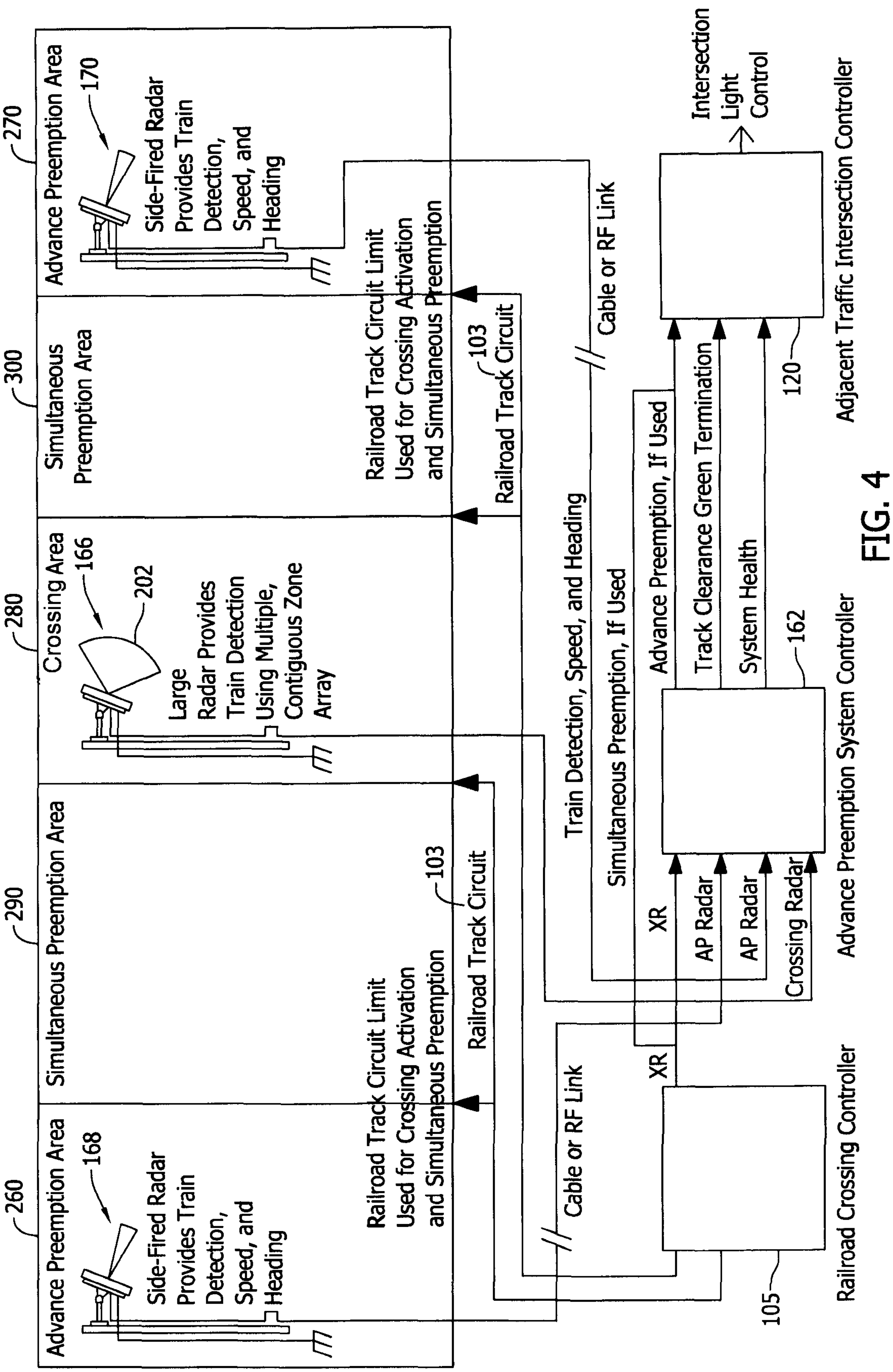
FIG. 4 is an exemplary traffic control preemption system schematic for the layout shown in FIGS. 2 and 3.

FIG. 1 is a block diagram of an exemplary railroad crossing system 100 according to an exemplary embodiment of the present invention. FIG. 2 illustrates an exemplary system layout 200 including an exemplary railroad crossing 202 and adjacent vehicular traffic intersection 204 that may be monitored by portions of the system 100 shown in FIG. 1 to detect an approaching locomotive train. FIG. 3 illustrates a portion of FIG. 2 with the locomotive train passing through the crossing 202. FIG. 4 illustrates a schematic of the traffic control preemption system 100 and different locations of the equipment therefor.

As shown in FIGS. 1 and 2, the railroad crossing system 100 may include a railroad train detection system 102 described further below that is configured to provide a signal input to a railroad crossing warning system 104 when a detected locomotive train is on approach to a railroad crossing 202. As defined herein, a "railroad crossing" shall mean an intersection of railroad tracks 206, 208 with a vehicular roadway 210. Each railroad track 206, 208 shown in FIG. 2 includes a respective set of opposed rails 207, 209. Each track 206, 208 may accommodate different trains traveling in the same or different directions on the respective rails 207, 209 as respectively indicated by arrows A and B in FIG. 2. The roadway 210 includes traffic lanes allowing automotive vehicles to traverse the crossing 202 in the directions indicated by arrow C and D.

While an exemplary system layout 200 is illustrated in FIG. 2, numerous variations of the crossing layout shown are possible, however, such that the particular layout shown in FIG. 2 is provided for the sake of illustration rather than limitation. For example, while the directions indicated with arrows A and B are generally perpendicular to the directions of arrows C and D in FIG. 2 (i.e., the roadway 210 and the railroad tracks 206, 208 run substantially perpendicular to one another), in other embodiments, the roadway 210 may cross the tracks 206, 208 at an oblique angle rather than the right angle orientation shown in FIG. 2. The roadway 210 may also include more than two traffic lanes.

As another example of another possible crossing layout, while two tracks 206, 208 are shown in the example of FIG. 2, it is appreciated that greater or fewer numbers of tracks 206, 208 may alternately exist in other embodiments. That is, a single track crossing is possible and so are three or more tracks in a possible crossing layout.

As still a further possible crossing layout variation, while the two tracks 206 and 208 are shown in FIG. 2 running in a spaced apart and parallel relation to one another, this need not be the case in all embodiments. The crossing 202 may include railroad tracks that are not parallel to one another.

Also, while one railroad crossing 202 is shown in FIG. 2, it is understood that multiple crossings 202 may be found along a section of the tracks 206, 208 that is sometimes referred to as a railroad corridor. Likewise, the roadway 210 may traverse multiple sets of railroad tracks at some distance from one another and define a plurality of crossings located further along the roadway 210. In contemplated embodiments, respective crossing systems 100 may generally be provided at any of the crossings in a railroad/roadway network, but are most commonly desired in heavily populated, urban areas and/or at highway crossings including relative high traffic counts and vehicles moving at relatively faster speed.

The crossing warning system 104, which may be housed in a railroad crossing equipment house 212 physically located at the crossing 202, sometimes referred to as an equipment bungalow, may activate one or more of a crossing gate 106, a warning light 108 and an audio warning 110 at the location of the crossing 202. The warning light 108 may be a flashing light, and the audio warning 110 may be a ringing bell or other sound to alert drivers of vehicles or pedestrians at the location of the crossing 202, or otherwise approaching the crossing 202, of an oncoming train 220 advancing toward the crossing 202. In contemplated exemplary embodiments, the warning light 108 and/or the audio warning 110 may be provided integrally with the crossing gate 106, or alternatively may be separately provided as desired.

While the crossing warning system 104 shown in FIG. 1 includes a crossing gate 106, a warning light 108, and an audio warning 110, variations of such warning elements are likewise possible in other embodiments. In simpler embodiments, for example, flashing warning light(s) 108 only may be provided, and the flashing warning lights 108 may or may not be associated with a crossing gate 106. Alternatively, in a more complex embodiment, multiple sets of crossing gates 106, flashing warning lights 108 and audible warnings 110 such as bells may be provided that may or may not be associated with the crossing gates 106. Various adaptations are possible having varying numbers (including zero) of crossing gates 106, varying numbers (including zero) of warning lights 108, and varying numbers (including zero) of audio warnings 110. Additional warning elements other than gates, lights and audio warnings are also possible. As shown in the example of FIG. 1, the crossing warning system 104 may include a controller 105 operating the elements 106, 108 and 110 in a generally known manner.

Typically, a train 220 approaching a highway-rail grade crossing 202 that is monitored by the system 100 is detected by railroad equipment that utilizes electrical connections to the rails 207, 209 of the railroad tracks 206, 208 themselves. Such equipment is sometimes referred to as a track circuit 103. While one track circuit 103 is shown in FIG. 1, it is understood that more than one track circuit 103 may be present at any given crossing 202.

Track circuit techniques apply signals as a set of frequencies to the rails 207, 209 of each track 206, 208 and monitor a return signal path to detect a presence of a train 220. As the train 220 is approaching the crossing 202, the conductive, metal axles at the front of the train 220 electrically shunt or short the rails 207 or 209 together and alter the spectral characteristics of the signals applied to the tracks 206, 208. Accordingly, the frequency makeup of the signals from the tracks 206 or 208 at the return path changes and the presence of the train 220 can be detected. These changes provide the track circuit based train detection equipment in the railroad train detection system 102 with an ability to determine how far away the approaching locomotive of the train 220 is and also at what speed it is traveling. The equipment of the railroad train detection system 102 is then able to dynamically activate the crossing warning system 104 at a point in time so that vehicular traffic at the crossing 202 is provided with a minimum of 20-30 seconds of warning time to exit the crossing 202, or perhaps other time periods determined by diagnostic surveys that consider train speeds, vehicle flow, and other parameters familiar to traffic control management personnel.

In known systems of the type described thus far, when the railroad train detection system 102 detects an oncoming train 220 via the track circuit 103, a relay switch 112 is deactivated to initiate the crossing warning system 104. The relay switch 112 is sometimes referred to as a Crossing Relay ("XR"). The crossing relay 112 may be deactivated by the train detection functions of a railroad system crossing controller (not shown in FIG. 1) associated with the track circuit 103.

In further and/or alternative embodiments, it is expected that wireless train control systems such as Positive Train Control (PTC) and Incremental Train Control Systems (ICTS) may serve as the train prediction system 102 in lieu of, or in addition to a track circuit 103 for purposes of the railroad train detection system 102. In contemplated embodiments of this type, Positive Train Control (PTC) and Incremental Train Control Systems (ICTS) may be able to redundantly or singularly activate the crossing warning system 104 via wireless signals communicated between the locomotive of the train 220 and the equipment of the crossing warning system 104, although adoption of such techniques is expected to be gradual and deployed in concert with track circuits due to the widespread reliance on costly, complex, but proven track circuit techniques. For now, railroad train detection with a track circuit 103 is the predominate form of train detection in the field, although it is by no means the only possible form of railroad train detection that may be utilized in the systems 100 or 102.

The cost of establishing and maintaining track circuits 103 in the detection system 102 is highly dependent upon their length and the complexity of contiguous crossings 202 on a rail corridor. In known train detection systems 102, track circuits 103 typically extend up to several thousand feet away from a crossing 202 in both directions (shown by arrows A and B) and on each track 206, 208 as shown in the example of FIG. 2. The length of the track circuit(s) 103 determines and limits the amount of warning time that the crossing warning system 104 can provide. If the rail corridor is comprised of a contiguous series of crossings 202 or includes other complex rail geometries, the cost and maintenance of the track circuits to detect trains within the corridor is dramatically increased.

The train detection system 102 including the track circuit(s) 103, the crossing warning system 104, the crossing gate 106, the warning light 108, the audio warning 110 and the crossing relay 112 are typically owned, installed, operated and maintained by a railroad organization. Collectively, these elements are accordingly referred to as railroad systems or equipment 114, and are operated primarily for the benefit of the railroad operator, sometimes referred to herein as a railroad organization. The railroad equipment 114, however, also has apparent benefits to vehicle drives near or at the crossing 202 at the time when an approaching train 220 is detected. That is, while the primary aim of the railroad equipment 114 is to protect the interests of the railroad organization, it has clear secondary effects on the owners of vehicles and traffic authorities for automotive traffic passing through the crossing 202.

When a railroad crossing 202 is located right next to a signalized traffic intersection 204, crossing activation status (i.e., the operating state of the crossing warning system 104) as well as crossing gate position (i.e., whether the crossing gates 106 are raised or lowered) are typically necessary to ensure safe and efficient traffic flow during times when a train 220 is approaching or occupying the crossing island or a predetermined area including, but not necessarily limited to, the actual physical intersection of the railroad tracks 206, 208 and the roadway 210. Generally speaking, vehicle traffic flow through and around the crossing 202 is neither an interest nor a responsibility of the railroad organization. Instead, local, state, or federal authorities are responsible for traffic control, and toward this end, a traffic controller 120 and signal lights 121, 122, 123, 124 are provided to regulate vehicle traffic flow through the signalized intersection 204. The traffic controller 120 and the signal lights 121, 122, 123 and 124 are sometimes referred to as a traffic control system 126.

Considering the example of FIG. 2, if a crossing 202 is located adjacent to a signalized highway intersection 204, sufficient time must be allotted to permit vehicular traffic that may be moving over the crossing 202 in the direction of arrow C in the example of FIG. 2 to be cleared through both the crossing 202 and the adjacent intersection 204 so that vehicles 222 are not still in the crossing 202 when the crossing warning system gates 106 descend to close the crossing island. This requires that a green light at a traffic signal 122 be issued by a traffic controller 120 responsible for the intersection 204 to allow vehicle traffic that is moving through the crossing 202 and towards the intersection 204 in the direction of arrow C. In addition, vehicle traffic must be prevented from entering the crossing 202 from one of the intersection roadways 210 by issuance of a red light at a traffic signal 124 to those traffic lanes and approaches in the direction of Arrow D. These traffic control measures, called Preemption, may sometimes be accomplished by providing the traffic intersection controller 120 with signals from the railroad's train detection system 102 and associated track circuit equipment.

From a traffic control perspective, there are generally two types of Preemption to consider, namely Simultaneous Prevention and Advance Preemption.

Simultaneous Preemption may be signaled to traffic intersection controllers 120 using the same circuit that the railroad equipment detecting system 102 uses to activate the crossing warning system 104 via the crossing relay (XR) 112. Upon assertion of the XR signal the crossing activation process begins by the crossing warning system 104. Descent of the crossing gate 106 can be delayed to permit vehicles 222 to clear the crossing 202 and to establish red light states at the applicable signals for other lanes of traffic. But in many cases, this imposes an inordinately lengthy period of delay on the intersection traffic flow—effectively increasing the overall crossing warning time to the point where vehicle traffic flow is unnecessarily impeded. This is increasingly the case as high speed and higher speed intercity passenger rail services are developed and as train speeds are increased on combined freight and passenger rail corridors.

It is possible for the XR signal to be simultaneously provided to the traffic intersection controllers 120 permitting the intersection controllers to preemptively clear the crossing island of vehicular traffic and to prevent vehicles from entering the crossing island prior to gate descent. But as high speed and higher speed intercity passenger rail services are developed and train speeds are increased on combined freight and passenger rail corridors, the amount of warning time necessary to preempt the traffic intersection signals while still providing the minimum amount of crossing warning time may require increasing the length of the track circuit based train detection for the sole purpose of providing longer preemption periods. For the reasons mentioned above, increasing the track circuit length is neither practical nor desirable in many instances.

Safe and coordinated operation of a railroad crossing warning system 104 and adjacent highway intersection traffic controllers 120 may be accomplished through the availability of a signal that is provided ahead of the signal that actually initiates activation of the crossing warning system 104, sometimes referred to as Advance Preemption. While the typical approach in conventional systems of this type may be long enough to support a minimum of 20-30 seconds warning time prior to the train's arrival at the crossing 202, some adjacent highway intersections 204 would preferably be provided a longer advance indication of train arrival so that the process of clearing the crossing 202 and resuming the flow of traffic in directions that do not include travel over the crossing 202 (e.g., traffic flow in the directions of arrows E and F in the example of FIG. 2) can begin in some cases even before the crossing gates 106 and flashing lights 108 are activated.

For most existing systems of the type described thus far, to provide highway intersection controllers 120 with Advance Preemption time periods longer than those time periods required for crossing activation by the railroad requires extension of the track circuit system (solely for the purpose of influencing the behavior of a non-railroad system). In many cases the cost and complexity of those track circuit extensions are cost prohibitive and can exceed the cost of the crossing itself. The additional maintenance burden, involving frequent FRA-mandated tests, further exacerbates an already unreasonable cost increase of extending track circuit(s) 103. And as the railroad systems trend toward increased complexity so too does the statistical probability of unstable and unreliable operation involving the entire corridor.

Further, the addition of track circuits 103 and associated maintenance to provide longer Advanced Preemption time periods increases railroad liability and risk because as a result the two systems (the railroad equipment system 114 and the traffic control system 126) would become operationally intertwined. In the event of any sort of accident or system malfunction the railroad will likely be exposed to potentially significant liability for injuries and damage.

It should be noted that railroads are not typically reluctant to share separate isolated outputs from its crossing relay (XR) 112—the signal that the railroads' train detection system 102 asserts for the purpose of activating the crossing warning system 104. This circuit, which must be maintained by the railroad, is the primary signal used for Simultaneous Preemption. However, as mentioned earlier, adjacent highway intersection controllers 120 increasingly prefer to utilize a signal representing a train-on-approach condition that precedes the XR signal, sometimes by as much as 40 to 60 seconds. Providing such extended Advance Preemption time, as opposed to a relatively simpler Simultaneous Preemption, to adjacent highway intersection controllers 120 typically requires substantial increases in track circuit lengths and results in increased maintenance costs and liability exposure for the railroad.

Preemption signals are clearly necessary to assure vehicles 222 have the opportunity to exit the crossing island prior to the arrival of a train 220. Prioritizing the clearance of the crossing island is accomplished by providing those lanes of traffic with a green signal and asserting a red traffic signal where necessary to prevent traffic from entering the crossing island. Accordingly, traffic in other directions on the roadway 224 (indicated by arrows E and F) through the traffic intersection 204 is also halted while vehicles 222 that may be on the crossing island are presented with a green signal to encourage clearance (called a Track Clearance Green signal). The Track Clearance Green Signal is typically provided for a predetermined period of time, and intentionally is predetermined to be a time period than is longer than typically necessary to clear the crossing island to provide a design safety margin.

Therefore, during the period immediately following either a Simultaneous Preemption or Advance Preemption as conventionally implemented, the only vehicles 222 that are permitted to move are those that may be in the crossing island while all other traffic is halted. However, once the crossing 202 is clear of vehicles 222 and it is no longer possible for any additional vehicles 222 to enter the crossing island, it is preferable that other vehicles 222 traveling through the adjacent highway intersection 204 along the roadway 224 be permitted to resume movement in the direction of arrow E or F that do not cross the tracks 206, 208.

Limiting situations where all traffic is stopped at the intersection 204, waiting for an intersection signal state to time-out and exhaust the Track Clearance Green Signal, wastes energy and also minimizes the chance that impatient vehicle drivers would elect to proceed through the intersection 204 in defiance of traffic signal intent. To address this possibility, a number of explicit signals exist that may potentially benefit a traffic controller 120 to verify a state where remaining portions of the adjacent highway intersection 204 may resume operation despite that the Track Clearance Green Signal time period has not expired. In other words, it would be desirable to provide some intelligence to the traffic controller 120 regarding the actual state of the crossing island that may allow the traffic controller 120 to, unlike many conventional systems, resume traffic flow once the crossing is actually cleared, rather than merely waiting for pre-set time-out intervals to expire that, at least to some drivers of vehicles 222 observing the state of the intersection 204, the crossing island 202 and applicable traffic signals 121 and 123 serve no beneficial purpose. In some situations that are even worse than this, some conventional system may operate to hold traffic flow along the roadway 224, and cause vehicles to wait for a longer period until the entire train has moved through the crossing 202 as would be indicated by the XR signal returning to indicate an inactive crossing state. Resuming traffic flow at an earlier point in time may dramatically improve traffic flow issues relative to such conventionally implemented systems.

An optional vehicle detection system 150 may optionally be provided in the crossing 202 to verify that no more vehicles 222 remain in the crossing 202 in a known manner, and therefor allow traffic flow to resume along the roadway 224 more quickly if such a state could be communicated to the traffic control system 126. Vehicle detection by the system 150 may be accomplished, for example, via inductive loops, radar, magnetometers, video analytics, and other known equipment and techniques. The vehicle detection system 150 may be provided as part of the railroad equipment 114 or may be separately provided in different embodiments. One or more sensors may optionally be provided to detect a train in the crossing 202, and one or more sensors (e.g., radar sensors), may be provided to detect vehicles in the crossing 202. In some cases, vehicle detection functionality may be accomplished by the same sensors that also provide train detection. As conventionally applied, however, other than radar or video based vehicle detection solutions, signals of the vehicle detection system 150 must originate from detectors that are located within the crossing island 202 and thus on railroad property, and as such are undesirable from the railroad organization's perspective. In particular, adding such vehicle detection equipment to a crossing 202 that did not previously include it introduces significant expense and ongoing maintenance concerns for the railroad if it is to be implemented by the railroad.

The traffic controller 120 could respond to the vehicle detection system 150, if present, when it determines that the crossing is clear of vehicles, rather than waiting for the Track Clearance Green Signal time period to expire. In some cases, however, the vehicle detection system 150 is simply not present and the railroad organization may be reluctant to provide access to the crossing 202 to install one. Alternatively, the prospect of adding a vehicle detection system 150 with third party equipment may not be completely satisfactory either because signals from a vehicle detection system 150 alone will not ensure that no other vehicles 222 will enter the crossing island 202. In other words, the vehicle detection system 150 may determine that the crossing 202 is clear of vehicles at any given point in time, but there is no assurance that the crossing 202 will remain clear of vehicles thereafter. For example, a vehicle 222 could enter the crossing 202 after crossing warning system activation by driving through or around a lowered crossing gate 106. In this case, the vehicle 222 could undesirably enter the crossing island 202 and, unfortunately, be prevented from exiting due to the resumed movement of intersection traffic by the traffic controller 120. There is accordingly perhaps good reason not to rely solely on vehicle detection equipment of the system 150 for traffic control purposes generally, or particularly to resume traffic flow at an earlier point in time than typically incurred in conventional systems.

A positive indication that entrance and exit crossing gates 106 have been activated may also optionally be provided in some embodiments to the traffic controller 120. When present, such positive indication or crossing gate position (i.e., whether the crossing gate arm or mast is in a raised position or a fully lowered position) also may indicate to the traffic controller 120 that vehicles 222 are not in the crossing island 202 and may allow for termination of a Track Clearance Green signal before the pre-set time period expires. Gate position indication is sometimes provided by a signal from the railroad equipment 114 for use by vehicle traffic control systems. For example, crossing gate position indication may be provided by a controller or switches associated with a motorized mechanism that raises and lowers the crossing gate mast or arm on command, and communication between the crossing gate controller and the traffic controller 120 may be hard-wired between the railroad equipment 114 and the traffic control system 126. Alternatively, gate position indication may be provided by a sensor mechanically coupled to the mast and configured to wirelessly communicate with the traffic controller 120 when the position of the crossing gate mast or arm changes. In many cases, and for practical reasons, however, no gate position confirmation is provided in existing systems.

Generally speaking, railroad organizations prefer not to provide gate position sensors or encourage reliance on them when provided. This is due in part to the additional costs to install, maintain, and periodically test the gate position sensors and associated equipment. Perhaps more important is liability concerns and exposure, and also crossing gate conditions that are outside the railroad's control that may impact their effectiveness. For instance, if a gate breaks or is damaged in a manner that the crossing arm or mast is either mostly missing or inadequate to provide any effective barrier over the roadway 210, but the crossing gate mechanism (i.e., the motor, controls and switches) are still operative, the gate position indication may show a gate down position when there is no gate that is down. Likewise, gate position sensors and cabling are sometimes inaccurate or prone to malfunction or breakage, either of which will provide false information to the traffic intersection controller 120 concerning gate position. Any accident that may result during a period when a gate or gate position sensor is not operating reliably exposes railroads to substantial liability risks.

Also, like the indication from the vehicle detection system 150, a Gate Down position signal alone will not ensure that a vehicle may not still enter the crossing at any moment and be subsequently be prevented from exiting. In other words, the gate being down does not necessarily mean that it will stay that way or that drivers of vehicles 222 will not seek to avoid them. As above, there may be instances where a gate 106 has been broken or damaged and can no longer be relied upon, or perhaps even noticed by a vehicle driver, as an effective barrier to vehicle entry into an activated crossing 202.

A positive indication that the train 220 is actually moving through the crossing island 202, rendering it an impossibility that any vehicles 222 are still in the crossing island roadway 210, may likewise afford the traffic controller 120 some intelligence to provide for termination of a Track Clearance Green signal before the conventionally applicable time-out period expires, or alternatively before an indefinite but likely longer time period until the train 220 completely passes through the crossing 202. Train occupancy of the crossing island 202 is sometimes provided by a crossing shunt signal from the railroad equipment 114, but in many cases is not. Such a train occupancy signal when provided, however, typically entails a hard-wired connection between the railroad equipment 114 and the traffic controller 120. Railroad organizations are, however, reluctant to interface railroad systems and equipment 114 with Traffic Control Systems 126 by adding train occupancy signal capability to railroad systems for such purposes.

In particular, railroads are exposed to substantial liabilities to high visibility consequences of train-auto collisions. The railroads' financial status frequently invites legal action against the railroad even in accident cases without clear merit regarding railroad culpability. Often, when there is an accident, the railroad organization does not escape without a settlement or penalty, often regardless of the true underlying causal factors. Consequently, railroads are hesitant to provide a variety of signals to traffic intersection controllers 120 solely to facilitate and optimize traffic flow, because in doing so, railroads become increasingly responsible for the overall coordinated operation of both the railroad crossing warning system 104 and the adjacent traffic control system 126.

Railroad reluctance to interface railroad systems 114 with traffic control systems 126 may also relate to uncertain liability risks if the combined systems do not work as expected—even if damaged due to other non-railroad causes. Liability exposure to the railroad organization may result if other, non-railroad parts of the combined highway/railroad system do not function as intended.

Uncertain but frequently increased maintenance costs and liability for any additional components or systems that reside on railroad property also contributes to a railroad's reluctance to interface the railroad systems 114 with traffic control systems 126 even if they do not directly connect to railroad system circuitry or structures. Likewise, an inability to effectively coordinate and confirm repairs related to railroad incidents that may have damaged or impaired interfaces between railroad and traffic intersection controller systems may explain a railroad's reluctance to interface railroad systems with traffic control systems more often.

Still other concerns that railroad organizations may have regarding implementing and providing interfaces between railroad systems 114 and traffic control systems 126 include: increased costs associated with installing and maintaining gate position sensor circuits connected to adjacent traffic intersection controllers; increased costs associated with installing and maintaining Island Relay circuit outputs to adjacent traffic intersection controllers; increased costs to add components and sensors to the railroad gate mechanism; additional railroad equipment exposure to transient, surge, and malicious damage due to increased exposed wiring brought out from the railroad equipment house 212; and increased maintenance responsibility for any components or equipment added to the railroad crossing system solely for the purpose of facilitating adjacent traffic intersection operations.

To overcome these and other issues in the art, a Traffic Control Preemption System 160 and related methods are proposed that, among other things, provide railroad crossing information including train detection capability and crossing occupancy detection for use by the traffic control system 126 to more efficiently direct and resume traffic flow, without requiring a direct interface with the railroad systems 114 at all. The above concerns of the railroad organizations are for practical purposes rendered moot, and reliable and safe traffic control measures may be facilitated with substantially longer Advance Preemption capability.

Advantageously, the Traffic Control Preemption system 160 provides extended Preemption capabilities without requiring the railroad organization to design, install, and maintain extended track circuits in order to provide train detection sooner than the train detection necessary to actually activate the crossing warning system 104 as described above. The Traffic Control Preemption system 160 is entirely independent of the railroad property and assets, and does not need to be connected to any railroad circuitry or infrastructure that the railroad does not already provide from the basic system that detects trains on approach and activates the crossing warning system. Rather, the Traffic Control Preemption system 160 may be installed operated and maintained by entities other than the railroad organization. In contemplated embodiments, the Advance Preemption system 160 also provides inherent capabilities to assess its own system health, to provide operational redundancies, and to detect the need—and automatically assert—necessary failsafe states in traffic intersection controllers.

In contemplated embodiments, the Traffic Control Preemption system 160 provides an adjacent traffic signal controller 120 with signal(s) that can be used to more promptly terminate a Track Clearance Green state, where the majority of vehicular traffic is halted as a result of a Simultaneous or Advance Preemption signal preceding the arrival of a train at the crossing. Toward this end the Traffic Control Preemption system 160 includes, as shown in the Figures, a controller 162, an island detection system 164 that provides an indication that no more traffic remains in the railroad-crossing island for which a Track Clearance Green signal is necessary or relevant, and an advance train detection system 166 that, as explained below, provides enhanced Advance Preemption capability. Neither the crossing island detection system 164 nor train detection system 166 requires the railroad organization to design, install, and components or systems to signal that the crossing island is absent of vehicles or alternatively that the crossing is occupied by the train itself.

As described in detail below, the Traffic Control Preemption system 160 combines and utilizes information pertaining to both the Advance Preemption and Track Clearance Green termination capabilities as a single system. It is contemplated, however, that the island detection system 164 and advance train detection system 166 may be separately provided in other embodiments to provide one or the other, but not necessarily both of the Advance Preemption and Track Clearance Green termination features.

The island detection system 164 in an exemplary embodiment may include one or more radar-based sensor(s) for vehicle detection, as well as train detection, at the crossing 202 as described further below. The island detection system 164 may include at least one sensor 165 (and perhaps even more than one sensor) capable of determining whether there are vehicles in the crossing a train passing through the crossing 202 as described below. In the case of detected vehicles 222 in the crossing island 202, the Track Clearance Green signal remains appropriate and should not be terminated.

As shown in FIG. 3, the crossing island detection system 164 is located at the crossing 202 to detect the situation where the train 220 is occupying the crossing 202. When the train 220 itself occupies the crossing 202 no vehicles 222 can be present and the Track Clearance Green signal may be therefore be terminated by the adjacent traffic intersection controller 120, permitting traffic flow on the roadway 224 not involving the crossing 202 to resume. In an exemplary embodiment the island detection system 164 may include a sensor 165 such as the crossing radar described in U.S. Pat. No. 8,596,587 that is hereby incorporated by reference herein. The crossing radar 165 may be configured to establish, for example, a detection footprint 230 that is quarter-circle shaped, 90 feet by 140 feet. Within this footprint 230, the railroad tracks 206, 208 are established as lanes and multiple contiguous detection zones are established on each side of the crossing 202, spanning all the tracks.

By utilizing multiple contiguous detection zones, the crossing radar 165 in this example is able to verify that the detected object is in fact a train due to the unique detection characteristics the train presents. Unlike a vehicle 222 or combination of vehicles 222, all detection zones are activated, indicating that a long connected vehicle is residing in all zones on both sides of the crossing, outside of the roadway (a detection scenario that only a train 220 can produce).

Whether Preemption is initiated through an Advance Preemption signal (occurring prior to crossing activation) or Simultaneous Preemption (derived from the railroad's XR signal), train detection on the crossing 202 provides an unequivocal Track Clearance Green termination. This permits regular traffic flow in the adjacent traffic intersection 204 to resume along the roadway 224 in directions that do not affect the crossing 202.

The advance train detection system 166 in contemplated embodiments may include a pair of sensor elements 168, 170 physically located at Advance Preemption points shown in FIGS. 2 and 4 that are generally outside the operating range and therefore beyond the track circuit capability of a conventional train detection system 102 included in the railroad equipment 114. In FIG. 4, these are shown as Advance Preemption areas 260, 270 in which train presence can be detected at locations beyond the capability of the railroad train detection system 102 and the track circuit 103 of the railroad equipment 114 to detect. As such, the advance train detection system 166 can detect a train 220 at a time and location prior to any ability of the railroad train detection system 102 to detect the train 220, and more specifically at a location or area potentially much farther away from the crossing island area 280 shown in FIG. 4. In between the crossing island area 280 and the Advance Preemption Areas 260, 270 shown in FIG. 4 are what is referred to herein as Simultaneous Preemption areas 290 and 300.

For example, the Advance Preemption points or areas 260, 270 including the advance train detection sensors 168, 170 may be located substantially more than several thousand feet on either side of the crossing 202, beyond a distance that conventional track circuits 103 typically cover. In exemplary embodiments, the advance train detection sensors 168 and 170 may be radar-based sensors positioned at each respective one of the Advance Preemption points. The radar-based sensors 168, 170 are configured to or capable of determining a presence of a train 220 as it approaches one of the Advance Preemption Points or areas 260, 270. The radar-based sensors 168, 170 are configured to or capable of determining train heading (i.e., direction of movement or travel), and train speed. This information can be communicated to the controller 162 of the Traffic Preemption Control System 160 to effect the intelligent traffic control functionality described below. The Traffic Preemption Control System 160 may also use the speed indication provided by sensors 168, 170 to adjust time when the Advance Preemption signal is provided to the Traffic System 126. Detecting the speed of a slower moving train allows the controller 162 to delay the Advance Preemption signal by an additional amount so that constant crossing clearance times are more similar to that required of a fast moving train. While one pair of advance train detection sensors 168, 170 is shown in the Figures, it is understood that greater or fewer sensors may be provided in the advance train detection system 166 in further and/or alternative embodiments of the train detection system 166.

When a pair of advance train detection sensors 168, 170 is provided as shown in the Figures, the Traffic Control Preemption System 160 is capable of determining an expected train arrival (based on the detected train speed and train heading or direction of travel) as the train 220 proceeds toward the crossing 202, and also a departure of the train 220 after passing through the crossing 202. Located at the end of each approach to the crossing 202 and crossing island 280, these radar-based sensor devices 168, 170 connect to the Preemption System Controller 162 via cable or an RF link in contemplated examples. Although other detection technologies may be used for the sensors 168, 170, a side-fired, dual-beam radar (operating like a dual trip wire) is preferred because these devices are uniquely capable to provide train detection, train speed, and train heading information. In addition, they feature all-weather performance and typically include internal self-check procedures that can continuously inform the Preemption System Controller 162 of radar system health as well as train movement at any desired distance from the crossing 202. Non-radar based sensors or detectors can be used in other embodiments, however, to detect train presence, speed, and heading information in an alternate manner as desired.

A primary feature of the advance train detection portion of the Preemption System 160 is its ability to detect train speed as well as presence and heading. By doing so, the Preemption System Controller 162 can continuously calculate the expected arrival of the train 220 at the crossing 202. Because other components of the system (specifically the Crossing Radar 165 of the island detection system 164 described above) perform a specific train detection function at the crossing 202 for the purpose of issuing a Track Clearance Green Termination, overall system functionality is tested at several points with each train move and crossing activation. This is accomplished by verifying that the predicted arrival of the train 220 at the crossing 202, as calculated using information from the sensor 268 or 270, actually occurs and does so consistently with the speed determination provided by them.

Since there is a sensor 168 or 170 on each track 206, 208 approaching the crossing 202, train detection speed and heading can also be detected at the distant points as the train clears the crossing 202. This provides another set of information from which the overall health of the system 260 can be assessed and verified by the Preemption System Controller 162.

Railroads typically are agreeable to provide an isolated XR signal (relay contact pair) to an adjacent traffic intersection controller 120 with minimal reluctance, because it is a standard part of all railroad crossing circuitry and doing so does not incur additional maintenance costs or significantly elevate railroad liability. Typically detecting a train 220 using conventional track circuits 103, the railroad's crossing controller 105 is capable of timing the activation of the crossing warning system 104 so that a pre-designated warning time is provided, generally between 20 and 30 seconds. Based on train speed and the desired crossing warning time period, the railroad's crossing controller equipment 114 will activate (de-energize) the XR relay 112 allowing its contacts to open, thereby activating the crossing as well as providing a simultaneous preemption signal to an adjacent traffic intersection controller.

Accordingly, and as shown in FIGS. 1 and 4, XR information (shared by the relay switch 112 of the railroad system 114) also signals the controller 162 of the Preemption System 160 when the train 220 has entered the extents of the railroad's normal track circuits 103. This information from the crossing relay 112 can be utilized in health assessment of the Advance Preemption system 160. Specifically, the controller 162 can compare the calculated arrival of the train 220 based on the information from the sensor 168 or 170 and the actual arrival of the train 220 at the crossing 202 as detected by the crossing relay 112. If there is a substantial difference between the calculated time of arrival of the train 220 and its actual time of arrival, including non-arrival, a malfunction of the sensor 168, 170 or other system error condition may be inferred. If, however, the calculated time of arrival of the train 220 closely matches its actual time of arrival as determined by the crossing relay 112, the Preemption System 160 is deemed to be operating properly.

This XR signal is therefor important to the Traffic Control Preemption System 160 described herein, because it provides valuable performance authentication information from which the system 160 can assess its own health. Because the railroad establishes a constant warning time for activation of the crossing 202 regardless of train speed, when the Preemption System Controller 162 receives an XR signal indication it knows the time of arrival as determined by the railroad equipment 114, and therefore the controller 162 can expect and verify that the train arrives at the crossing 202 at that time.

The sensor 165 of the crossing island detection system 164 also provides independent confirmation of train arrival from the XR signal indication. Feedback from the sensor 165 when a train is detected not only permits another basis to make a health assessment similar to that noted above, but also provides another possible diagnostic tool to assess an error condition. In particular, if the crossing island detection system 164 detects a train, but the XR indication does not indicate a train, a malfunction of the sensor 165 or other system error condition may be inferred. It is noted that this particular condition may reflect an error in the XR signal indication rather than the crossing island radar in the traffic preemption system 160, and the preemption controller 162 may be configured to deduce that the error is here rather somewhere in the traffic preemption system 160. When the controller 162 confirms such an error in the railroad equipment 114, it may communicate the same to the railroad organization in an automated manner.

The preemption system controller 162, like the other controllers mentioned in the various systems and subsystems described, may be a known input/output element configured to receive a desired number of inputs and generate outputs based on the received inputs. More specifically, and as used herein, the term "controller" shall include, for example, a microcomputer, a programmable logic controller, or other processor-based device. Accordingly, a controller may include a microprocessor and a memory for storing instructions, control algorithms and other information as required to function in the manner explained below. The controller memory may be, for example, a random access memory (RAM), or other forms of memory used in conjunction with RAM memory, including but not limited to flash memory (FLASH), programmable read only memory (PROM), and electronically erasable programmable read only memory (EEPROM). Alternatively, non-processor based electronics and circuitry may be provided in the controller with equal effect to serve similar objectives. For example, a supercapacitor may be provided to give the controller time to store procedure sensitive data such as the current state in a software based state machine in the event of power loss. Other elements such as line filters and capacitors for filtering noisy power may be included.

More specifically, the preemption system controller 162 may aggregate sensor information from the island detection system 164 and the train detection system 166 and provide different signals to the traffic intersection controller 120 for more efficient traffic control of the adjacent intersection 204. The controller 162 is also configured to monitor system health, and to furnish signals to an adjacent highway intersection controller 120. More specifically, the controller may furnish signals to the traffic controller 120, including, but not necessarily limited to an Advance Preemption trigger signal, a Track Clearance Green Termination signal, activation of "Second Train Coming" signage described below, and System Health status signals and information.

In contemplated embodiments the Preemption System Controller 162 processes information provided by the subsystems 164 and 166 and provides one of the following outputs to the Adjacent Traffic Intersection Controller 120.

An Advance Preemption Signal is triggered by detection of a train 220 with the train detection system 166. When the Advance Preemption signal is sent to the traffic controller 120, it may operate the applicable signal lights 122 or 124 to clear the crossing 202 in the anticipation of the train 220. Because a greater advance warning is provided by the Preemption System 160 than the railroad equipment 114 is able to provide, the traffic controller 120 can be less reliant on time-out signals that have been conventionally been implemented and may more efficiently direct traffic flow away from the crossing while minimizing, if not eliminating, instances where all traffic at the intersection 204 is stopped because of traffic signal issues resulting from the railroad crossing activation.

In some embodiments, the controller 162 may provide a Simultaneous Preemption signal instead of Advance Preemption as described above. The simultaneous Preemption signal may be triggered by the XR signal input to the controller 162 that is provided directly by the railroad. In such embodiments, the controller 162 of the Preemption System 160 can provide Simultaneous Preemption capability without requiring a direct connection between the railroad equipment 114 and the traffic controller 120. The Preemption System 160 facilities a retrofit installation to an existing crossing 202 that otherwise offers no such Simultaneous Preemption capability. The Preemption System 160 can also be utilized at crossing that does not include any provisions in the railroad equipment 114 to provide Advance Preemption.

The Preemption System controller 162 also provides a Track Clearance Green Termination signal to the traffic controller 120 when applicable. The Track Clearance Green Termination signal is triggered when the island detection system 164 detects that no more vehicle traffic will be moving through the crossing 202. In varying embodiments this can be the result of no vehicles 222 being detected in the crossing 202 or the detection of a train 220 in the crossing 202.

In an exemplary embodiment, the Preemption System 160 includes interrelated capabilities for Advance Preemption and Track Clearance Green Termination signals. For systems 100 that do not utilize Advance Preemption, however, and instead operate with Simultaneous Preemption (initiated by the railroad's XR signal), the Preemption System 160 may be configured to include the Track Clearance Green Termination signal alone.

The Preemption System controller 162 is also configured to conduct health assessments of the Preemption System 160. When a System Health Failure condition is detected, the controller 162 instructs the Adjacent Traffic Intersection Controller 120 to execute failsafe sequences prescribed for particular intersection configurations. The failsafe sequences may be determined by traffic studies and diagnostic surveys in a known manner.

A nominal train move through the crossing 202 involves a logical sequence of signals that may be derived from train detection, train speed, distances between points established by the railroad around the crossing 202, and crossing activation timing parameters established by the railroad. From these data, a train 220 can be expected to be at particular points at known times and any disruption of this process or illogical sequence can trigger a System Health failure so that the Adjacent Traffic Intersection Controller 120 can respond in the safest manner System Health Failure can be derived and triggered by a multiplicity of states sensed by the Preemption System Controller 162 including: a detected power loss; a loss of communication with the island detection system 164 or the train detection system 166; invalid messages (e.g. failed checksum or message frequency) from either the island detection system 164 or the train detection system 166; a calculated time of train arrival at the crossing (based on train detection, train speed, and heading information from the initial sensor of the train detection system 166) that is not confirmed by the island detection system 164; a calculated time of train arrival at the crossing (based on the railroad's XR signal and the crossing warning system's constant warning time setting) that is not confirmed by the island detection system 164; a detection (or absence of detection) of the railroad's XR signal inconsistent with the calculated train position, based on detection, speed, and heading information from the train detection system 166 and confirmed train presence at the crossing from the island detecting system 164; a calculated time of train arrival (based on the railroad's XR signal and the crossing's nominal constant warning time settings) at the crossing not confirmed by the island detection system 164; a calculated time of train arrival (based on detection, speed, and heading information from the train detection system) at the distant sensor of the train detection system 166 that is not confirmed; and/or any illogical, out of sequence train detection based on absolute detection, or calculated position of the train based on detected train speed.

Any detected or inferred error condition may be immediately and automatically reported to a responsible party at a local or remote location using any known communication link or communication device desired. Detailed logs may be kept of system performance by the controller 162, including train crossing detections by the various sensors and subsystems provided, calculated times of arrival, actual times of arrival, comparisons of expected times and calculated times, signal types provided to the traffic controller 120, any error condition, or any other information or parameter of interest regarding system operation. Detailed records and reports may be generated by the controller 162, or data provided by the controller 162 to diagnose and troubleshoot the system on demand.

Having now described the functionality of the Traffic Control Preemption System 160, it is believed that appropriate algorithms to make the calculations and comparisons described, generate the traffic measure signals described, and assess and communicate health status, as well as programming of the controller 162 to execute such functionality, is within the purview of those in the art without further explanation.

The Traffic Control Preemption System 160 and/or its functionality may likewise be integrated in one or more of the other systems and subsystems described above. Likewise, method steps performed by the Traffic Control Preemption System 160 described may be combined with other methods, process and steps performed by one or more of the other systems and subsystems described above. That is, the Preemption capabilities described may be subsumed in or otherwise added to the railroad equipment 114, or the Preemption capabilities described may be subsumed in or otherwise added to the traffic control system 126 rather than being an independent system as described.

Figure 5:
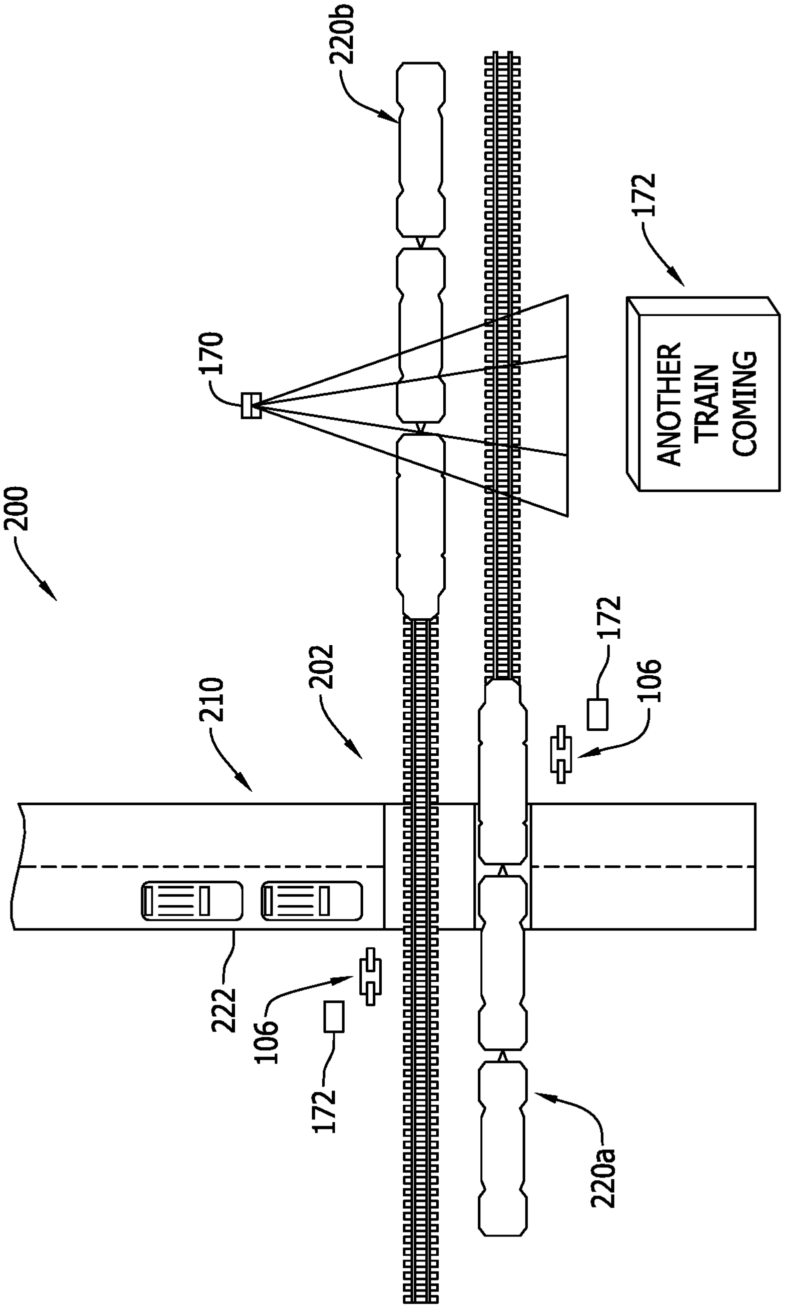
FIG. 5 is a view similar to a portion of FIG. 3 but illustrating a second train approaching the crossing and a warning capability related to the second train.

As also shown in FIGS. 1 and 5, the non-track circuit detection techniques adopted in the traffic control preemption system 160 to detect a train on approach has further application for a "Second Train Coming" signage or warning feature. In the condition illustrated in FIG. 5, when a first train 220*a* is already occupying a crossing 202, whether the train 220 a is moving or stationary, the typical railroad circuitry necessary to activate the crossing warning system 104 has done so. The crossing gates 106 are accordingly down and lights 108 are flashing due to the singular de-energizing of the crossing XR (Crossing Relay) circuit. At that point, the arrival of a second train 220*b* is redundant in a conventional system. That is, the crossing warning system 104 stays activated because the XR relay stays in the same state. Existing railroad train detection and crossing activation circuitry does not distinguish the condition where a second train 220*b* is about to pass over the crossing 202.

Consequently, accidents may occur because pedestrians and motorists may attempt to pass over the crossing 202 once the first train 220*a* clears the crossing island, only to encounter the second train 220*b* that is just entering the crossing 202. To address, and hopefully avoid, such a possibility a "Second Train Coming" electronic sign has been shown to provide adequate indication of these conditions. However, the railroad circuitry necessary to distinguish the potential arrival of a second train necessary to activate an electronic sign is costly and, in some cases, difficult to engineer into crossing designs. Such warning signs relating to a second train coming are therefore not included in many railroad equipment systems.

Moreover, it is typically the domain of the highway and traffic engineers overseeing the traffic control system 126 to call for and have a "Second Train Coming" electronic sign implemented by the railroad. For various reasons, however, highway and traffic engineers do not demand or request such second train signage, and as a result many crossings do not include them for reasons apart from the railroads themselves.

By utilizing the non-railroad method of train detection described above in the traffic preemption control system 160, detection of a train 220 and activation of a "Second Train Coming" warning elements 172, that in contemplated embodiments may be electronic signs, can be easily implemented without the direct involvement of the railroad and without major re-configuration of the crossing warning system 104.

As seen in FIG. 5, one warning element 172 may be provided on each side of the crossing 202 or at other locations as desired. While two warning elements 172 are shown in FIG. 5, additional warning elements 172 may also be utilized. Elements 172 other than electronic signs may be utilized if desired, with a large number of different possible types of warnings be provided in other embodiments.

Because the train detection system 166 includes two independently operable advance train detection sensors 168, 170 in the examples illustrated, the second sensor 170 can easily detect the second train 220*b* before the first train 220*a* reaches the Advance Preemption point where the sensor 170 is located. Also because the preemption system controller 160 is in continuous communication with the advance train detection sensors 168 and 170 as well as the island detection sensor 165, the controller 162 can distinguish the two trains 220*a* and 220*b*. When the second train 220*b* is detected, the controller 162 can activate the second train combining warning element 172 to place vehicle drivers and others at the crossing on notice of the second train, as well as provide appropriate signals to the traffic controller 126 regarding train occupancy by the first train 220*a* at the crossing and also the second train 220*b* when it reaches the crossing 202.

Depending on the placement of the advance train detection sensors 168, 170 they may each simultaneously detect and distinguish two different trains 220*a*, 220*b* within their respective fields. The radar-based sensors 168, 170 may distinguish the two trains 220*a*, 220*b* when simultaneously present by different directions of movement (e.g. two objects moving in different directions), by differences in size of objects detected, and/or by differences in speed of detected objects. As such, the preemption system controller 162 may further determine two trains moving in different directions and activate the warning elements 172 or two trains 220*a*, 220*b* moving in the same direction and activate the warning elements 172 accordingly. Because each sensor 168, 170 can provide heading and speed information, the controller 162 can calculate the time of arrival of the second train 220*b* and conduct its health assessment based on the compared expected arrival based on the calculation and the confirmed arrival by the sensor 165 of the island detection or the XR signal from the railroad equipment 114.

When two trains 220*a*, 220*b* are detected, the preemption controller 162 can communicate with the traffic controller 120 accordingly and vehicle traffic flow through directions along the roadway 224 not passing through the crossing 202 may continue until both the first and second trains 220*a*, 220*b* have cleared the crossing 202, which may be doubly confirmed by the island detection sensor 165 and the advance preemption sensors 168 and/or 170. The island detection sensor 165 can confirm the clearing of the crossing 202 and each sensor 168, 170 can confirm each train 220*a*, 220*b* passing through the respective preemption points. Once the crossing 202 is clear and/or when the departure of each train 220*a*, 220*b* has been confirmed, the preemption controller 162 may signal the traffic controller 120 to resume its normal traffic signal cycle until the next train detection occurs.

The Second Train Coming feature may be implemented in the traffic control preemption system 160 described or provided as a standalone system in different embodiments. Further, the Second Train Coming feature and its functionality may likewise be integrated in one or more of the other systems and subsystems described above. Likewise, methods associated with the Second Train Coming feature described may be combined with other methods, process and steps performed by one or more of the other systems and subsystems described above. That is, the Second Train Coming feature and capabilities described may be subsumed in or otherwise added to the railroad equipment 114, or the Second Train Coming feature and capabilities described may be subsumed in or otherwise added to the traffic control system 126 rather than being part of the traffic preemption system 160. When combined with non-track circuit train detection techniques, the Second Train Coming feature may be easily applied as a retrofit adaptation of an existing crossing 202 that does not otherwise include such capability, and without impacting the concerns of the railroad organization.

Figure 6:
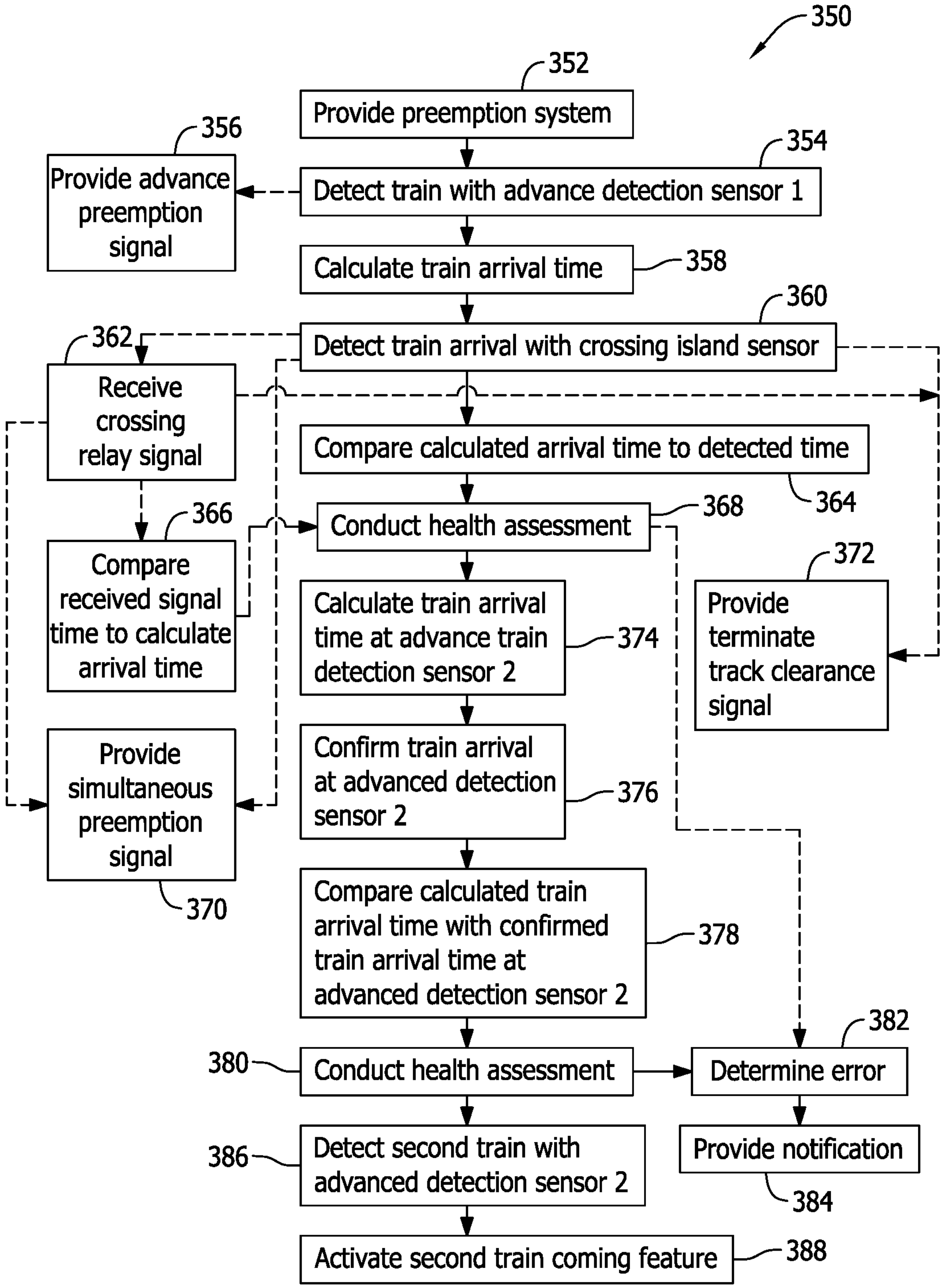
FIG. 6 is an exemplary flowchart of processes implemented with the traffic control preemption system shown in FIGS. 1-5.

FIG. 6 is an exemplary flowchart of processes 350 implemented with the traffic control preemption system 160 shown in FIGS. 1-5 and described above.

At step 352, the traffic control preemption system 160 is provided including the controller 162 and the associated elements shown and described in relation to FIG. 1. It is understood that some of the elements shown and described in FIG. 1 in the traffic control preemption system 160 may be considered optional and need not be included in some embodiments. The step 352 of providing the traffic control preemption system may include the manufacture of the system components, acquiring the system components from a third party, and installing and interfacing the system components as described in relation to a railroad crossing 202. Generally, the arrangement of components shown in FIG. 4 is expected.

At step 354, a train is detected with a first one of the advance preemption sensors 168 or 170 which may be radar-based sensors as described above. The sensors 168, 170 allow the train detection, heading and speed to be determined. As shown at step 356, the preemption system controller 162 provides the advanced preemption signal to the traffic control system 126 (FIG. 1) and more specifically to the traffic controller 120. As described above, additional time is provided via the advanced preemption signal to clear the crossing 202 of vehicles 222 as described in relation to FIG. 2. Beneficially, the advanced preemption signal may be provided without interfacing or involving the railroad equipment 114 in any way.

As shown at step 358, the preemption system controller 162 may calculate the expected arrival time of the train 220 at the crossing 201. This is possible because of the speed and heading information available from the first advance preemption sensor 168 or 170.

At step 360, the preemption system controller 162 detects train arrival at the crossing 202 with the crossing island sensor 165 described above. The crossing island sensor 165 provides a signal to the preemption system controller 162 when the train 220 is present as the crossing 202 as described above in relation to FIG. 3. Optionally, and as shown at step 362, the preemption system controller 162 may receive a signal from the crossing island relay 112 of the railroad equipment 114.

At step 364, the preemption system controller 162 compares the calculated train arrival from step 358 to the detected time of train detection from step 362. Likewise, at step 366, the preemption system controller 162 compares the calculated train arrival from step 358 to the detected time of train detection from step 366. Based on the comparison of step 364 and/or step 366, a health assessment is conducted at step 368.

The signal received from the crossing island sensor 165 causes the preemption system controller 162 to provide the simultaneous preemption signal as shown in step 370 to the to the traffic control system 126 (FIG. 1) and more specifically to the traffic controller 120. When supplied, the signal received from the crossing island relay 112 of the railroad equipment 114 also causes the preemption system controller 162 to provide the simultaneous preemption signal as step 370 to the traffic control system 126 (FIG. 1) and more specifically to the traffic controller 120.

The preemption system controller 162 provides the terminate track clearance signal at step 372 when the train 220 is detected in the crossing 202 at step 360 independently from the operation of the railroad equipment 114. The terminate track clearance signal can also be provided based on the crossing relay signal received at step 362 from which the train speed can be determined and its expected time of arrival at the crossing 202 can be computed. In any event, the terminate track clearance signal is provided to the traffic control system 126 (FIG. 1) and more specifically to the traffic controller 120. Beneficially, any unnecessary delay in terminating the track clearance signal is avoided because the system is not dependent on expiration of predetermined time intervals as conventional systems are.

At step 374, the preemption system controller 162 calculates an expected time of arrival of the train 220 at the second advance train detection sensor 170 described above. The calculation at step 374 may be derived in combination with the calculation made at step 358. As noted above, the train speed can also be determined from the crossing relay signal or other known techniques.

At step 376, the train's arrival is confirmed by the preemption system controller 162 upon detection of the train 220 by the second advance detection sensor 170 on the opposite side of the crossing 202 from the first advance detection sensor 168 per step 354.

At step 378, the preemption system controller 162 compares the calculated train arrival from step 374 to the confirmed time of train detection from step 376. Based on the comparison of step 378 a health assessment is conducted at step 380.

For either the health assessment steps 368 or 380, error states can be determined or deduced at step 382 using any of the considerations described above. The logical assessments described above can be used to determine a healthy or normal operating state or an unhealthy or abnormal operating state as described above. If error states or conditions are determined at steps 384, appropriate notifications can be made by the preemption system controller 162. Such notifications may be received by the traffic control system 126 in an automated manner, to other systems local and remote from the crossing 202, and to desired persons and personnel responsible for oversight of the railroad and traffic systems along a railroad corridor.

At step 386, the preemption system controller 162 may detect an arrival of a second train **220*b* advancing toward the crossing 202 with the second advance train detection sensor 170 before the first detected train 220*a* completely leaves the crossing area. When the second train 220*b* is detected, the preemption system controller 162 activates the second train coming feature 172 as shown at step 388. The preceding steps can then be performed to assess movement of the second train 220***b* through the crossing 202, provide health assessments, etc. In the instance of a second train detection, however, the advance preemption signal, the simultaneous preemption signal and the track clear signal are not provided by the preemption system controller 162. The preemption system controller 162 in this state need only hold the traffic signals in the state that they are in. Traffic along the roadway 224 may continue to move while traffic through the crossing 202 is prevented from moving. When the second train 220*b* has safely cleared the crossing 202 (and assuming that no other train is arriving) the preemption system controller 162 returns to step 354 and awaits detection of another train.

Figure 7:
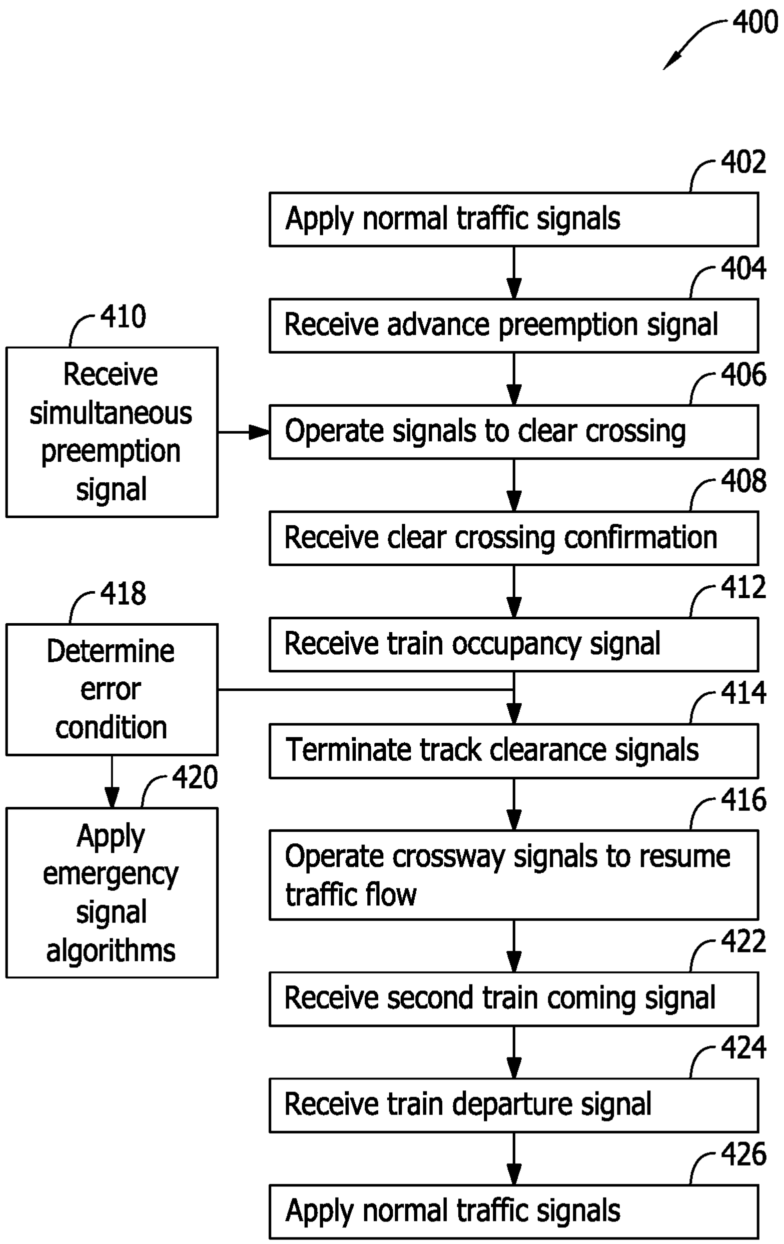
FIG. 7 is an exemplary flowchart of processes implemented with the traffic control system shown in FIGS. 1-4.

FIG. 7 is an exemplary flowchart of processes 400 implemented with the traffic control system 126 shown in FIGS. 1-4. The processes assume that the traffic control preemption system 160 described is installed and interfaced with the traffic control system 126, and specifically the traffic controller 120.

At step 402, the traffic controller 120 applies its normal traffic signal algorithms or routines as determined by the traffic authorities and regulations. In this state, there is no train 220 approaching the railroad crossing 202 and the traffic controller 120 operates the traffic signals 121, 122, 123 and 124 without regard to considerations of the railroad crossing 202.

At step 404, the traffic controller 120 receives an advance preemption signal from the preemption system controller 162. When the advance preemption signal is received, the traffic controller 120 interrupts its normal routine and operates the applicable signals in a manner needed to clear the crossing 202 as shown at step 406. That is, considering the example of FIG. 2, traffic along the roadway 224 is halted, a green light is issued to allow traffic in the crossing 202 to clear the crossing 202, and a red light is issued to keep oncoming traffic from entering the crossing along the roadway 210. At step 408, a signal is received that the crossing has been cleared from the crossing island detection system 164.

At step 410, the traffic controller 120 may also receive the simultaneous preemption signal from the preemption system controller 162 or the crossing island relay 112. When the simultaneous preemption signal is received, the traffic controller 120 interrupts its normal routine (if not already interrupted) and operates the applicable signals in a manner needed to clear the crossing 202 as shown at step 406.

At step 412, the train occupancy signal is received from the preemption system controller 162. Once the train occupancy signal is received, the traffic controller 120 may terminate the track clearance signals at step 414 to halt traffic over the crossing 202, and at step 416 may operate the traffic signals to resume traffic flow along the roadway 224.

At step 418 and 420, an error condition may be determined and the traffic controller 120 may apply any emergency signal algorithms deemed to be appropriate. The error determination at step 418 may be made by the traffic controller itself or may be communicated from the preemption system controller 162.

At step 422, the traffic controller 120 may receive a second train coming signal from the preemption system controller 162, and at step 424 the traffic controller 120 may receive a train detection departure signal from the preemption system controller 162. The signals 422 and 424 allow the traffic controller 120 to return the normal traffic signal algorithms or routines as shown at step 426, and the traffic control system effectively returns to step 402 until the next advance preemption signal is received.

Having now described the functionality of the preemption and traffic controllers 162, 120 algorithmically, it is believed that programming of the controllers 162, 120 to execute such algorithms is within the purview of those in the art without further explanation.

The benefits and advantages of the inventive concepts described herein are now believed to have been amply illustrated in relation to the exemplary embodiments disclosed.

Advantageous embodiments of traffic control preemption systems are described that provide railroad crossing status information to adjacent traffic intersection controllers in a manner that does not involve direct physical connections to the railroad equipment and/or does not involve expansion of railroad systems or additional placing of equipment on railroad property by the railroad organization. The traffic control preemption systems and associated methods of controlling vehicle traffic through a signalized vehicle roadway intersection adjacent to a railroad crossing provides considerably improved vehicular traffic flow and enhanced safety for vehicle drivers traversing the railroad crossing. Longer lead times prior to a train's arrival at the crossing are facilitated by the traffic control preemption system and communicated to a traffic controller to more effectively operate traffic signals proactively well in advance of a train approaching the crossing. Various signals are provided by a controller of the traffic control preemption signal to more effectively clear the crossing of vehicles and to more effectively and more promptly resume traffic flow once the crossing island is cleared.

More particularly, and by virtue of the traffic control preemption systems and methods, traffic flow may be promptly resumed in directions that do not involve vehicles on the crossing. As soon as the train is determined to be either on the crossing or as the train just about to be on the crossing, the traffic control preemption system generates a signal that allows traffic flow to be resumed in directions that do not involve the crossing. Without such a signal, or alternatively a signal from the railroad system to indicate the same conditions, vehicular traffic is conventionally delayed or impeded, with vehicles remaining at a standstill in all directions, until the train is past the crossing.

The primary, unique aspects of the traffic control preemption system include at least the following aspects. The traffic control preemption system need not be owned or procured by the railroad, and the traffic control preemption system does not physically or directly connect to any railroad circuitry or system. Accordingly, a railroad organization does not need to supply, interface or maintain the traffic control preemption system. Because the traffic control preemption system operates independently from a railroad crossing warning system, and in particular at least in some embodiments independently detects a presence of a train approaching the railroad crossing and also independently detects a presence of a train in the railroad crossing, the traffic control preemption system is not reliant upon any railroad system, engineering, or equipment to operate. Accordingly, the railroad does not need to add and/or maintain supplemental train detection systems or equipment that may otherwise be required to interface with traffic control systems of an adjacent signalized intersection, including but not limited to additional track circuit sections for the sole purpose of providing advance preemption traffic control measures.

In one aspect, the traffic control preemption system advantageously includes a non-track circuit train detection system and method of train detection. The non-track circuit train detection system and method is provided for the purpose of deriving an advance preemption signal for the benefit of a traffic controller at the adjacent signalized vehicle traffic intersection. Such non-track circuit systems and methods may also beneficially serve additional purposes such as activating a crossing warning system without the use of track circuits. Cost effective, retrofit adaptation of an existing passive railroad crossing to include functionality of an active (that is, with flashing lights and gates) crossing warning system is therefore facilitated. Also, cost effective retrofit application to an existing traffic intersection that lacks traffic signals or preemption capabilities may be provided with such functionality at substantially lower cost that current or prior systems involving additions, modification or expansion to the railroad systems to provide crossing status information interfaces for traffic control purposes. Advanced preemption signals may be provided with substantially longer advance time periods than are practically provided with conventional railroad crossing equipment.

In another aspect, the traffic control preemption system advantageously generates or derives a signal that informs traffic intersection equipment that a train is occupying a crossing is provided in a manner that does not involve track circuits, crossing shunt circuits, gate position, or otherwise utilize a signal provided by the railroad equipment associated with the crossing. The derivation of such a signal allows the traffic controller to terminate a track clearance state and resume operation of traffic signals in a manner that more promptly and effectively allows traffic flow to resume through the intersection while the train and lowered gates prevent vehicles from moving into the crossing.

In another aspect, the traffic control preemption system and method detects a train moving through a railroad crossing utilizing at least one large footprint radar-based sensor configured to provide multiple contiguous detection zones on each side of the crossing, strategically placed to facilitate detection of a train that is on, and moving through the crossing. Such a sensor can also detect a presence of vehicles inside the crossing thus providing information to a traffic intersection controller that can be used to further optimize intersection traffic flow.

In another aspect, the traffic control preemption system may verify an operation of a train detection system operating independently of a railroad train detection system, and providing valuable health signals based on such verification. For example, by calculating and verifying the location, direction, and speed of a locomotive train at multiple points or locations as it moves towards, through, and past a grade crossing, a general health condition of the traffic control preemption system can be assessed in real time. By verifying train detection at the multiple points or locations and comparing them to expected times of arrival at each location, system health may assessed and communication to a traffic controller for an adjacent signalized intersection. The health state of the traffic control preemption system may be utilized by the traffic controller to beneficially enhance traffic flow and safety at the vehicle intersection adjacent a railroad crossing. A degree of redundancy and failsafe protection capability is provided that generally does not exist in conventional railroad crossing systems and traffic control systems adjacent railroad crossing.

In another aspect, the traffic control preemption system may implement Advance Preemption traffic measures independent of the railroad systems that calculates a constant activation time for highway intersection preemption. Specifically, the system may detect the speed of a train and adjust a timing of the Advance Preemption signal communicated to the traffic control system. The traffic control system accordingly will receive Advance Preemption signals on a consistent basis (i.e., with about the same lead time prior to train arrival) despite varying speeds of trains as they approach the crossing.

In another aspect, the traffic control preemption system additionally provides a system and method of detecting arrival of a second train for activation of a "Second Train Coming" warning element such as an electronic sign or other display.

An embodiment of a traffic control preemption system for the benefit of a traffic controller at a signalized vehicle traffic intersection adjacent to a railroad grade crossing has been disclosed. The system includes a non-track circuit train detection system operable independently from railroad crossing equipment provided at the railroad grade crossing, and a preemption controller in communication with the non-track circuit train detection system. The preemption controller is configured to provide at least one preemption signal for use by the traffic controller to improve operation of the signalized traffic intersection in response to the non-track circuit train detection system.

Optionally, the non-track circuit train detection system includes first and second advance train detection sensors each provided outside an operating range of a track circuit of the railroad crossing equipment. Each of the first and second advance train detection sensors may be radar-based sensors. The preemption controller may be configured to, based on a signal from one of the first and second advance train detection sensors, calculate an expected time of arrival of a detected train at the railroad grade crossing. The preemption controller may be configured to, based on the calculated expected time of arrival of the train at the railroad grade crossing, conduct a health assessment of the traffic control preemption system.

The non-track circuit train detection system may also optionally include a crossing island detection system. The crossing island detection system may include at least one radar-based sensor. The preemption controller may be configured to provide a terminate track clearance signal to the traffic controller in response to a train detection with the crossing island detection system.

The preemption controller may also be configured to verify an independent operation of a train detection system of the railroad equipment, and to conduct a health assessment of the traffic control preemption system.

The traffic control preemption system may include a first sensor and a second sensor operable in combination to detect an arrival of first train and a second train simultaneously passing between the first and second sensors. The traffic control preemption system may further include a warning element for the arrival of the second train. The warning element may include a display.

Another embodiment of a traffic control preemption system for the benefit of a traffic controller at a signalized vehicle traffic intersection adjacent to a railroad grade crossing has been disclosed. The system includes a train detection system comprising at least one radar-based sensor operable independently from railroad crossing equipment provided at the railroad grade crossing, and a preemption controller in communication with the at least one radar-based sensor, wherein the preemption controller is configured to provide at least one preemption signal for use by the traffic controller and a terminate track clearance signal for use by the traffic controller to improve operation of the signalized traffic intersection in response to the at least one radar-based sensor.

Optionally, the at least one radar-based sensor may include first and second advance train detection sensors each provided outside an operating range of a track circuit of the railroad crossing equipment. The preemption controller may be configured to, in response to one of the first and second advance train detection sensors, calculate an expected time of arrival of a detected train at the railroad grade crossing. The preemption controller may be configured to, based on the calculated expected time of arrival of the train at the railroad grade crossing, conduct a health assessment of the traffic control preemption system. The first and second advance train detection sensors may be operable in combination to detect an arrival of first train and a second train simultaneously passing between the first and second sensors. The traffic control preemption system may further include a warning element for the arrival of the second train.

The at least one radar-based sensor may also include a crossing island sensor. The preemption controller may be configured to provide the terminate track clearance signal in response to the crossing island sensor.

The preemption controller may be configured to verify an independent operation of a train detection system of the railroad equipment, and the preemption controller is configured to conduct a health assessment of the traffic control preemption system.

An embodiment of a traffic control preemption system for the benefit of a traffic controller at a signalized vehicle traffic intersection adjacent to a railroad grade crossing has also been disclosed. The system includes a train detection system comprising at least one radar-based sensor operable independently from railroad crossing equipment provided at the railroad grade crossing, the train detection system including first and second advance train detection sensors, and a preemption controller in communication with the first and second advance train detection sensors. The preemption controller is configured to, in response to the first and second advance train detection sensors, communicate to the traffic controller a presence of a first train passing between the first and second sensors and a presence of a second train simultaneously passing between the first and second sensors.

Optionally, the traffic control preemption system further includes a warning element for the arrival of the second train when the presence of the second train is detected. The preemption controller may be further configured to conduct a health assessment based on a detection of at least one of the first and second trains by each of the first and second advance train detection sensors A method of improving traffic flow at a signalized vehicle traffic intersection adjacent to a railroad grade crossing provided with railroad crossing equipment has also been disclosed. The method is implemented by a control preemption system including a controller and a plurality of train detection sensors provided at respectively different locations relative to the rail grade crossing, and the method includes: detecting a presence of at least one train by at least one of the plurality of train detection sensors in a manner independent from the railroad crossing equipment provided at the railroad grade crossing; and communicating, with the controller, at least one preemption signal for use by a traffic controller of the signalized intersection and a terminate track clearance signal for use by the traffic controller upon detection of the at least one train by the at least one of the plurality of train detection sensors.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A traffic control preemption system for the benefit of a traffic controller at a signalized roadway intersection for automotive vehicle traffic, the system comprising:

a non-track circuit train detection system operable independently from railroad crossing equipment provided at a railroad grade crossing, the railroad crossing being adjacent to but separate from the signalized roadway intersection;

a preemption controller in communication with the non-track circuit train detection system, wherein the preemption controller outputs a preemption signal to the traffic controller, and the traffic controller being operatively responsive to the preemption signal to:

operate a plurality of signal lights at the signalized roadway intersection to clear the railroad grade crossing from automotive vehicle traffic; and without waiting for a pre-set time-out interval to expire, operate the plurality of signal lights to enhance automotive vehicle traffic flow through the signalized roadway intersection by resuming automotive vehicle traffic flow through the signalized roadway intersection in a direction that does not traverse the railroad grade crossing; and a crossing island detection system including at least one radar-based sensor, wherein the preemption controller is configured to provide a terminate track clearance signal to the traffic controller in response to a train detection with the crossing island detection system.

2. The traffic control preemption system of claim 1, wherein the non-track train detection system includes first and second advance train detection sensors each provided outside an operating range of a railroad track circuit for the railroad grade crossing.

3. The traffic control preemption system of claim 2, wherein the first and second advance train detection sensors each comprise a radar-based sensor.

4. The traffic control preemption system of claim 2, wherein the preemption controller is configured to, based on a signal from one of the first and second advance train detection sensors, predict a time of arrival of a detected train at the railroad grade crossing.

5. The traffic control preemption system of claim 4, wherein the preemption controller is configured to, based on the predicted time of arrival of the detected train at the railroad grade crossing, conduct a health assessment of the traffic control preemption system.

6. A traffic control preemption system for the benefit of a traffic controller at a signalized roadway intersection for vehicle traffic, the system comprising:

a non-track circuit train detection system operable independently from railroad crossing equipment provided at a railroad grade crossing adjacent to but separate from the signalized roadway intersection;

a preemption controller in communication with the non-track circuit train detection system, wherein the preemption controller outputs a preemption signal to the traffic controller, and the traffic controller being operatively responsive to the preemption signal to enhance vehicular traffic flow through the signalized roadway intersection; and a crossing island detection system including at least one radar-based sensor;

wherein the preemption controller is configured to provide a terminate track clearance signal to the traffic controller in response to a train detection with the crossing island detection system.

7. The traffic control preemption system of claim 6, wherein the non-track train detection system includes at least one advance train detection sensor provided outside an operating range of a railroad track circuit.

8. The traffic control preemption system of claim 7, wherein the at least one advance train detection sensor is a radar-based sensor.

9. The traffic control preemption system of claim 6, wherein the preemption controller is configured to, based on a signal from the at least one advance train detection sensor, calculate an expected time of arrival of a detected train at the railroad grade crossing.

10. The traffic control preemption system of claim 6, wherein the preemption controller is configured to verify an independent detection of a train by a separately provided train detection system.

11. The traffic control preemption system of claim 6, wherein the non-track circuit train detection system includes a first sensor and a second sensor at a respective distance from the railroad grade crossing, the first sensor and the second sensor operable in combination to detect a presence of a first train and a second train simultaneously passing between the first and second sensors on respectively different railroad tracks.

12. The traffic control preemption system of claim 11, further comprising a warning element for an arrival of the second train at the railroad grade crossing.

13. A traffic control preemption system for the benefit of a traffic controller at a signalized roadway intersection for vehicle traffic, the system comprising:

a train detection system comprising at least one radar-based sensor operable independently from railroad crossing equipment provided at a railroad grade crossing adjacent to but separate from the signalized roadway intersection; and a preemption controller in communication with the at least one radar-based sensor, wherein the preemption controller provides at least one preemption signal and a terminate track clearance signal to the traffic controller to improve vehicular traffic flow through the signalized roadway intersection in response to a detected train by the at least one radar-based sensor.

14. The traffic control preemption system of claim 13, wherein the at least one radar-based sensor includes first and second advance train detection sensors each provided outside an operating range of a track circuit of the railroad crossing equipment.

15. The traffic control preemption system of claim 14, wherein the preemption controller is configured to, in response to one of the first and second advance train detection sensors, calculate an expected time of arrival of a detected train at the railroad grade crossing.

16. The traffic control preemption system of claim 13, wherein the first and second advance train detection sensors are operable in combination to detect a simultaneous presence of a first train on a first railroad track advancing away from the railroad grade crossing and a second train on a second railroad track advancing toward the railroad grade crossing.

17. The traffic control preemption system of claim 16, further comprising a warning element for the arrival of the second train at the railroad grade crossing.

18. The traffic control preemption system of claim 13, further comprising a radar-based crossing island sensor.

19. The traffic control preemption system of claim 18, wherein the preemption controller is configured to provide the terminate track clearance signal in response to the radar-based crossing island sensor.

20. The traffic control preemption system of claim 13, wherein the preemption controller is configured to verify a detected train by comparison to an independent operation of a separate train detection system of the railroad crossing equipment.

21. A traffic control preemption system for signal lights at a signalized roadway intersection adjacent to but separated from a rail grade crossing, the system comprising:

a first train detecting element adjacent a railroad track passing through the rail grade crossing, the first train detecting element being a radar-based train detection sensor located at a distance from rail grade crossing, the radar-based train detection sensor being configured to determine a heading and speed of a detected train advancing toward the rail grade crossing; and a controller that is operatively responsive to a detected train by the first train detecting element, and based upon the determined speed of the detected train the controller being configured to issue a preemption signal that interrupts a normal traffic signal routine for the signalized roadway intersection with at least a predetermined amount of warning time to clear vehicles from the rail grade crossing before the detected train arrives.

22. The traffic control preemption system of claim 21, wherein the first train detecting element is located at least several thousand feet from the railroad grade crossing.

23. The traffic control preemption system of claim 21, further comprising a second train detection element detecting an occupancy of the detected train at the rail grade crossing.

24. The traffic control preemption system of claim 23, wherein the second train detection element is a radar-based train detection sensor.

25. The traffic control preemption system of claim 23, wherein the controller is configured to issue a terminate track clearance signal to at least one of the signal lights in response to the detected occupancy.

26. The traffic control preemption system of claim 21, wherein the controller is a preemption system controller that is in communication with a traffic controller for the signal lights.

* * * * *